US012724593B2

(12) United States Patent
Yang et al.

(10) Patent No.: US 12,724,593 B2
(45) Date of Patent: Sep. 1, 2026

(54) OPTIMIZING TENSOR TILING IN NEURAL NETWORKS BASED ON A TILING COST MODEL

(71) Applicant: SambaNova Systems, Inc., Palo Alto, CA (US)

(72) Inventors: Bowen Yang, Palo Alto, CA (US); Zhuo Chen, Palo Alto, CA (US); Chen Liu, Palo Alto, CA (US); Fei Wang, Palo Alto, CA (US); Ruobing Wang, Palo Alto, CA (US); Qinghua Li, Palo Alto, CA (US); Weiwei Chen, Palo Alto, CA (US); Junjue Wang, Newark, CA (US); Sumti Jairath, Palo Alto, CA (US)

(73) Assignee: SambaNova Systems, Inc., Palo Alto, CA (US)

( * ) Notice: Subject to any disclaimer, the term of this patent is extended or adjusted under 35 U.S.C. 154(b) by 282 days.

(21) Appl. No.: 18/129,714

(22) Filed: Mar. 31, 2023

(65) Prior Publication Data

US 2023/0315410 A1 Oct. 5, 2023

Related U.S. Application Data

(60) Provisional application No. 63/330,730, filed on Apr. 13, 2022, provisional application No. 63/330,740, (Continued)

(51) Int. Cl.
*G06F 8/41* (2018.01)
*G06F 17/11* (2006.01)

(52) U.S. Cl.
CPC .............. *G06F 8/443* (2013.01); *G06F 17/11* (2013.01)

(58) Field of Classification Search
CPC ...................................................... G06F 8/443
See application file for complete search history.

(56) References Cited

U.S. PATENT DOCUMENTS

| | | | |
|---|---|---|---|
| 8,146,040 | B1 | 3/2012 | Janneck et al. |
| 10,768,979 | B2 | 9/2020 | Williams |

(Continued)

FOREIGN PATENT DOCUMENTS

| | | | |
|---|---|---|---|
| WO | 2010142987 | A1 | 12/2010 |

OTHER PUBLICATIONS

Koeplinger et al., Spatial: A Language and Compiler for Application Accelerators, PLDI '18, Jun. 18-22, 2018, Association for Computng Machinery, 16 pages.

(Continued)

*Primary Examiner* — Jae U Jeon
(74) *Attorney, Agent, or Firm* — FP Patents; Sikander M. Khan; Bruce A. Young

(57) ABSTRACT

A method comprises a compiler analyzing a graph to determine a pipeline of operators based on a shared dimension of input and output tensors among the operators. The operators are included in the graph and the graph corresponds to a dataflow application. The compiler determines a tiling decision associated with the pipeline and a tiling cost associated with the tiling decision. The tiling decision can comprise a tile shape to slice tensors of operators of the pipeline. Based on the tiling cost, the compiler determines that the tiling decision improves an optimization objective and includes the pipeline and tiling decision in mapping decisions associated with executing the application on a computing system. The compiler can apply a tiling cost model to determine the tiling costs. A computer program product and a computing system can implement the method.

20 Claims, 11 Drawing Sheets

Related U.S. Application Data filed on Apr. 13, 2022, provisional application No. 63/327,313, filed on Apr. 4, 2022, provisional application No. 63/326,762, filed on Apr. 1, 2022, provisional application No. 63/326,206, filed on Mar. 31, 2022.

(56) References Cited

U.S. PATENT DOCUMENTS

| | | | |
|---|---|---|---|
| 11,062,202 B2 | 7/2021 | James et al. | |
| 11,080,227 B2 | 8/2021 | Koeplinger et al. | |
| 11,163,546 B2 | 11/2021 | Rong | |
| 11,182,221 B1 | 11/2021 | Sivaramakrishnan et al. | |
| 11,195,080 B1 | 12/2021 | Nama et al. | |
| 11,227,207 B1 | 1/2022 | Nama et al. | |
| 11,328,208 B2 | 5/2022 | Lie et al. | |
| 11,410,027 B2 | 8/2022 | Chen et al. | |
| 11,500,871 B1 | 11/2022 | Kulkarni et al. | |
| 11,521,062 B2 | 12/2022 | Janssen et al. | |
| 11,567,735 B1 | 1/2023 | Kulkarni et al. | |
| 12,293,298 B2 | 5/2025 | Elango | |
| 2019/0146763 A1 | 5/2019 | Gould | |
| 2019/0228037 A1 | 7/2019 | Nicol et al. | |
| 2019/0279086 A1 | 9/2019 | Nicol et al. | |
| 2019/0340492 A1* | 11/2019 | Burger | G06N 3/0495 |
| 2020/0133859 A1 | 4/2020 | Gottin et al. | |
| 2020/0216900 A1* | 7/2020 | Bunyavanich | C40B 40/08 |
| 2021/0049465 A1 | 2/2021 | Bogdan et al. | |
| 2021/0320825 A1* | 10/2021 | Banuli Nanje Gowda | H04L 25/03159 |
| 2021/0365248 A1 | 11/2021 | ChoFleming, Jr. et al. | |
| 2022/0012028 A1 | 1/2022 | Yount et al. | |
| 2022/0276865 A1 | 9/2022 | Rieber | |
| 2022/0309336 A1* | 9/2022 | Minkin | G06F 17/16 |
| 2023/0004365 A1* | 1/2023 | Hanebutte | G06F 8/44 |
| 2023/0023101 A1* | 1/2023 | Su | G06F 17/16 |

OTHER PUBLICATIONS

List of related cases—SBNV1114USC01, Jun. 6, 2024, 2 pages.

M. Emani et al., Accelerating Scientific Applications With Sambanova Reconfigurable Dataflow Architecture, in Computing in Science & Engineering, vol. 23, No. 2, pp. 114-119, Mar. 26, 2021, [doi: 10.1109/ MCSE.2021.3057203].

Podobas et al, A Survey on Coarse-Grained Reconfigurable Architectures From a Performance Perspective, IEEEAccess, vol. 2020. 3012084, Jul. 27, 2020, 25 pages.

Prabhakar et al., Plasticine: A Reconfigurable Architecture for Parallel Patterns, ISCA, Jun. 24-28, 2017, 14 pages.

U.S. Appl. No. 16/239,252 Final Office Action, dated Jan. 8, 2020, 13 pages.

U.S. Appl. No. 16/239,252—Notice of Allowance dated Feb. 12, 2020, 10 pages.

U.S. Appl. No. 16/239,252—Office Action dated Aug. 7, 2019, 8 pages.

U.S. Appl. No. 16/239,252—Response to Final Office Action dated Jan. 8, 2020, filed Jan. 24, 2020, 14 pages.

U.S. Appl. No. 16/239,252—Response to Office Action dated Aug. 7, 2019, filed Sep. 26, 2019, 6 pages.

U.S. Appl. No. 17/216,651 Notice of Allowance, dated Aug. 5, 2021, 14 pages.

U.S. Appl. No. 17/216,651 Response to First Office Action, dated Jul. 13, 2021, filed Jul. 23, 2021, 14 pages.

U.S. Appl. No. 17/216,652 Non-Final Rejection, dated Aug. 2, 2021, 24 pages.

U.S. Appl. No. 16/239,252—Notice of Allowance dated May 14, 2020, 15 pages.

U.S. Appl. No. 17/216,651—Non-Final Rejection, dated Jul. 13, 2021, 12 pages.

Bosilca, George, et al. "The Template Task Graph (TTG)—an emerging practical dataflow programming paradigm for scientific simulation at extreme scale." 2020 IEEE/ACM Fifth International Workshop on Extreme Scale Programming Models and Middleware (ESPM2). IEEE, 2020. pp. 1-7. (Year: 2020).

Chien, Steven WO, et al. "TensorFlow doing HPC." 2019 IEEE International Parallel and Distributed Processing Symposium Workshops (IPDPSW). IEEE, 2019. pp. 509-518. (Year: 2019).

Kirisame, Marisa, et al. "Dynamic tensor rematerialization." arXiv preprint arXiv:2006.09616 (2020). pp. 1-31. (Year: 2020).

Liao et al. Differentiable programming tensor networks, Physical review X 9.3 (2019): pp. 031041-1 to 031041-12. (Year : 2019).

Yuan et al, Dynamic control flow in large-scale machine learning, Proceedings of the Thirteenth EuroSys Conference, 2018.pp. 1-15 (Year:2018).

* cited by examiner

200
OP DATA 202
WEIGHT 204
WEIGHT 206
FORWARD SECTIONS 210
CONV 212A
214A
RELU 212B
CONV 212C
RELU 212D
MAXPOOL 212E
214B
BACKWARD SECTIONS 220
224A
CONV2D BWD 222A
RELU BWD 222B
224B
CONV2D BWD 222C
RELU BWD 222D
MAXPOOL 222E
OUTPUT GRADIENT 208
WEIGHT 206

OPTIMIZING TENSOR TILING IN NEURAL NETWORKS BASED ON A TILING COST MODEL

CROSS-REFERENCE AND INCORPORATIONS

This application claims the benefit of U.S. Provisional Patent Application No. 63/327,313 filed Apr. 4, 2022, which is incorporated by reference herein in its entirety.

This application further claims the benefit of U.S. Provisional Patent Application No. 63/330,730 filed Apr. 13, 2022, which is incorporated by reference herein in its entirety.

This application further claims the benefit of U.S. Provisional Patent Application No. 63/330,740 filed Apr. 13, 2022, which is incorporated by reference herein in its entirety.

This application further claims the benefit of U.S. Provisional Patent Application No. 63/326,206 filed Mar. 31, 2022, which is incorporated by reference herein in its entirety.

This application further claims the benefit of U.S. Provisional Patent Application No. 63/326,762 filed Apr. 1, 2022, which is incorporated by reference herein in its entirety.

The following are incorporated by reference for all purposes as if fully set forth herein:

Prabhakar et al., "Plasticine: A Reconfigurable Architecture for Parallel Patterns," ISCA '17, Jun. 24-28, 2017, Toronto, ON, Canada;

Koeplinger et al., "Spatial: A Language and Compiler for Application Accelerators," *Proceedings of the 39th ACM SIGPLAN Conference on Programming Language Design and Implementation* (PLDI), Proceedings of the 43rd International Symposium on Computer Architecture, 2018.

U.S. Nonprovisional patent application Ser. No. 16/239,252, filed Jan. 3, 2019, titled "VIRTUALIZATION OF A RECONFIGURABLE DATA PROCESSOR,";

U.S. Nonprovisional patent application Ser. No. 16/536,192, filed Aug. 8, 2019, entitled "COMPILER FLOW LOGIC FOR RECONFIGURABLE ARCHITECTURES,";

U.S. Nonprovisional patent application Ser. No. 16/572,527, filed Sep. 16, 2019, entitled "PERFORMANCE ESTIMATION-BASED RESOURCE ALLOCATION FOR RECONFIGURABLE ARCHITECTURES,";

U.S. patent application Ser. No. 16/922,975, filed Jul. 7, 2020, titled "RUNTIME VIRTUALIZATION OF RECONFIGURABLE DATA FLOW RESOURCES,";

U.S. Nonprovisional patent application Ser. No. 17/216,651, filed Mar. 29, 2021, entitled "LOSSLESS TILING IN CONVOLUTION NETWORKS-TILING CONFIGURATION,";

U.S. Nonprovisional patent application Ser. No. 17/216,652, filed Mar. 29, 2021, entitled "LOSSLESS TILING IN CONVOLUTION NETWORKS-SECTION BOUNDARIES,";

U.S. Nonprovisional patent application Ser. No. 17/384,507, filed Jul. 23, 2021, entitled "LOSSLESS TILING IN CONVOLUTION NETWORKS-BACKWARD PASS,"; and, U.S. Nonprovisional patent application Ser. No. 18/128,104, filed Mar. 29, 2023, titled "SEARCHING CONVOLUTIONAL NETWORK NODES BASED ON NAMED TENSOR DIMENSIONS,", by Yang, et al.

FIELD OF THE TECHNOLOGY

The technology disclosed relates to neural networks in machine learning and artificial intelligence computing systems. In particular, the technology disclosed relates to compilers for computing systems using reconfigurable processors, such as coarse-grain reconfigurable processors to execute convolutional neural networks.

BACKGROUND

The present disclosure relates to compilers for data parallel and dataflow applications and determining allocation of computing system hardware resources to execute such applications. The applications can include machine learning, Artificial Intelligence, and convolutional neural networks. In particular the present disclosure relates to partitioning tensor data in convolutional neural networks.

BRIEF DESCRIPTION OF THE DRAWINGS

The drawings included in the present disclosure are incorporated into, and form part of, the specification. They illustrate implementations of the present disclosure (hereinafter, "the disclosure) and, along with the description, serve to explain the principles of the disclosure. The drawings are intended to be only illustrative of certain implementations and are not intended to limit the disclosure.

Figures 1, 2:
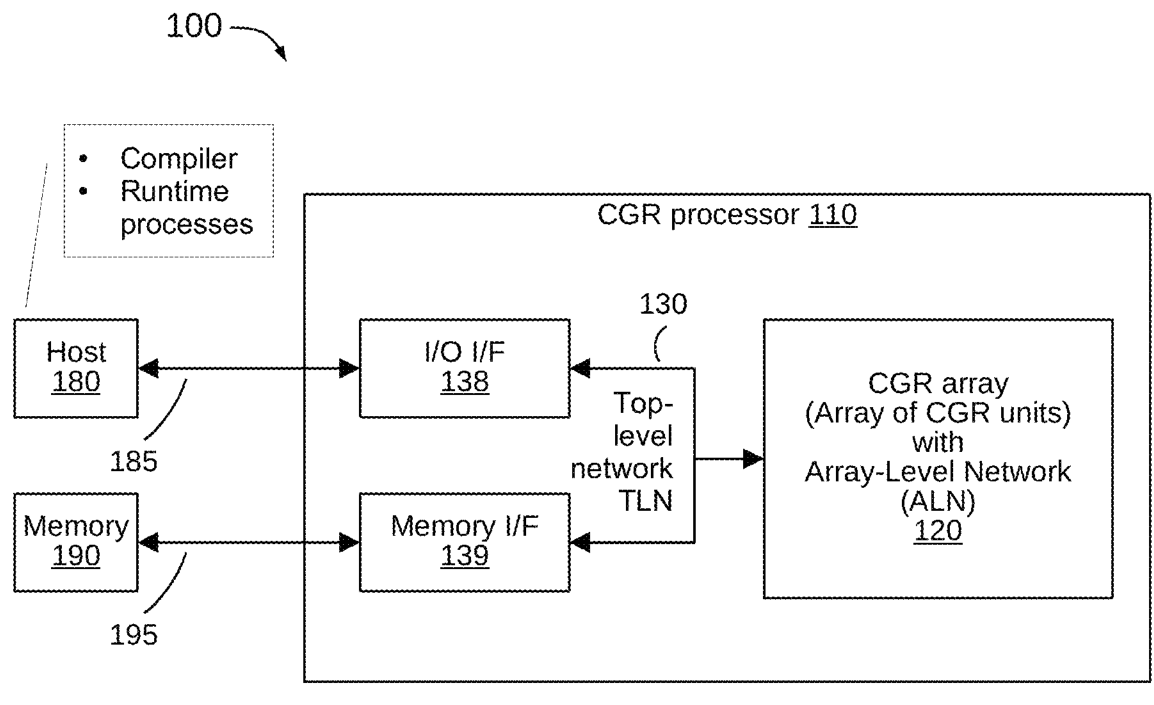
FIG. 1 illustrates an example coarse-grain reconfigurable (CGR) system (CGRS), according to aspects of the disclosure.
FIG. 2 illustrates an example sub-graph, according to aspects of the disclosure.

In the figures, like reference numbers can indicate functionally similar elements. The systems and methods illustrated in the figures, and described in the Detailed Description below, can be arranged and designed in a wide variety of different implementations. Neither the figures nor the Detailed Description are intended to limit the scope of the claims. Instead, they merely represent examples of different implementations of the disclosed technology.

SUMMARY

A method comprises a compiler, executing on one computing system, determining a pipeline of operators of a graph based on a shared dimension of output and input tensors of the operator, and in which the graph corresponds to a dataflow application. The method further comprises the compiler determining a tiling decision associated with the pipeline, and determining a tiling cost associated with the tiling decision. The tiling cost corresponds to an optimization objective associated with executing the dataflow application by a second computing system. Based on the tiling cost, the compiler determines that the tiling decision improves the optimization objective and includes the pipeline and tiling decision among mapping decisions associated with executing the dataflow application by the second computing system.

In the method, the compiler can determine a tiling decision associated with an operator included in the graph and can determine a tiling cost associated with the operator tiling decision. Based on the operator tiling cost, the compiler can determine that the operator tiling decision improves the second optimization objective and can include the operator and the operator tiling decision among the mapping decisions associated with executing the dataflow application by the second computing system.

Also in the method, the compiler can determine a second pipeline based on a second shared dimension of output and input tensors of a second set of operators included in the graph. The compiler can determine a tiling decision associated with the second pipeline and determine a second tiling cost corresponding to the second tiling decision. The second tiling cost can be based on a second optimization objective. Based on the second tiling cost, the compiler can determine that the second tiling decision does not improve a second optimization and can exclude the second pipeline from among the mapping decisions associated with executing the dataflow application by the second computing system.

A computer program product and a computing system can implement the method. The second computing system can comprise a coarse-grain reconfigurable architecture computing system.

DETAILED DESCRIPTION

Aspects of the present disclosure (hereinafter, "the disclosure") relate to methods of compiling neural network applications for execution on computing systems utilizing reconfigurable dataflow processing elements, in particular utilizing coarse-grain reconfigurable processors (CGRPs). More particular aspects relate to determining mappings of neural network operators and data flow to CGRP processing and/or memory elements, and/or configurations of CGRP processing and/or memory elements. Implementations of the disclosure (hereinafter, "implementations") can analyze a computation graph of a machine learning model to determine alternative mappings.

Processing elements that implement aspects of the disclosure can include processors of data parallel (DP) and/or dataflow computing systems, such as Central Processing Unit (CPUs), Graphics Processing Units (GPUs), Field Programmable Gate Arrays (FPGAs), and Digital Signal Processors (DSPs). Certain aspects of the disclosure relate to executing neural networks on computing systems utilizing reconfigurable processor architectures, such as CGRPs, reconfigurable Application Specific Integrated Circuits (ASICs), and/or Application Specific Instruction-set Processors (ASIP).

Implementations that are not mutually exclusive are taught to be combinable. One or more features of an implementation can be combined with other implementations. The disclosure in some instances repeats references to these options. However, omission from some implementations of recitations that repeat these options should not be taken as limiting the combinations taught in the preceding sections—these recitations are hereby incorporated forward by reference into each of the following implementations.

Particular expressions of the disclosure will be understood to have the following operative meanings:

The phrases "at least one"; "one or more"; and "and/or" are to be understood as open-ended expressions that operate both conjunctively and disjunctively. For example, each of the expressions "at least one of A, B, and C", "at least one of A, B, or C", "one or more of A, B, and C", "one or more of A, B, or C", and "one or more of A, B, and/or C" means A alone, B alone, C alone, A and B together, A and C together, B and C together, or A, B, and C together.

The term "a" or "an" entity refers to one or more of that entity. As such, the terms "a"/"an", "one or more", and "at least one" can be used interchangeably herein.

The terms "comprising", "including", and "having" can be used interchangeably herein.

Unless otherwise specified, the use of ordinal adjectives first, second, third, etc., to describe an object, merely refers to different instances or classes of the object and does not imply any ranking or sequence.

As used herein, "incorporated subject matter" refers, collectively, to subject matter disclosed, and/or otherwise encompassed, among the disclosures incorporated herein by reference. For purposes of illustrating the disclosure, but not intended to limit implementations, various terms of the disclosure are drawn from the incorporated subject matter. As used herein, unless expressly stated otherwise, such terms as can be found in the incorporated subject matter have the same meanings, herein, as their meanings in their respective incorporated disclosures.

Aspects of the disclosure can be appreciated through a discussion of example implementations and/or applications of methods and/or systems. However, such examples are for purposes of illustrating the disclosure. It should be understood that the intention is not to limit the disclosure to the example implementations described herein, but to encompass all modifications, equivalents, and alternatives falling within the spirit and scope of the disclosure. Thus, the disclosure is not intended to be limited to the implementations shown but is to be accorded the widest scope consistent with the principles and features disclosed herein. Various modifications to the disclosed examples will be readily appreciated by those of ordinary skill in the art, and the general principles defined herein can be applied to other implementations of the disclosure without departing from the spirit and scope of the disclosure.

The disclosure uses terms and acronyms related to the field of the technology, defined, at least in part, herein as:

AI—artificial intelligence.

AIR—arithmetic or algebraic intermediate representation.

ALN—array-level network.

Application Model—In machine learning applications, "application model" commonly refers to a mathematical representation of a machine learning application. An application model can comprise an application graph and/or textual (e.g., high level, intermediate level, and/or low level programming language) representation. An application model can represent a set of mathematical operators (compute functions of an application) and a flow of data between the operators, and can represent the operators and dataflow graphically and/or textually. As used herein, "application model" or, simply, "model" refers interchangeably to an application itself (e.g., high level programming statements of an application) and a graphical and/or textual representation of the application's compute functions and/or dataflow.

Buffer—an intermediate storage of data.

CGR—coarse-grained reconfigurable. A property of, for example, a system, a processor, an architecture (see CGRA), an array, or a unit in an array. This property distinguishes the system, etc., from field-programmable gate arrays (FPGAs), which can implement digital circuits at the gate level and are therefore fine-grained configurable.

CGRA—coarse-grained reconfigurable architecture. A data processor architecture that includes one or more arrays (CGR arrays) of CGR units.

CGR unit—a circuit that can be configured and reconfigured to locally store data (e.g., a memory unit or a partition memory unit, such as described in Prabhakar), or to execute a programmable function (e.g., a processor or other compute unit, or a partition compute unit such as described in Prabhakar). A CGR unit includes hardwired functionality that performs a limited number of functions used in computation graphs and dataflow graphs. Some implementations include switches to route data among CGR units.

CGR Array—an array of CGR units, coupled with each other through an array-level network (ALN), and coupled with external elements via a top-level network (TLN). In implementations a CGR array can physically implement the nodes and edges of a computation and/or dataflow graph.

CGRP—Coarse-grain reconfigurable processor. As used herein, CGRP refers to a processor, or processing element, based on a CGRA—such as an integrated circuit, chip, or module based on, or incorporating, a CGRA—and/or incorporates a CGR unit, CGR array, or elements of a CGR unit and/or a CGR array.

CGR Components—As used herein, "CGR components" refers, collectively, to hardware resources or elements of CGR units, CGR arrays, and CGRP; memories of CGR units/arrays/processors; and, networks and/or I/O interconnections and interface hardware interconnecting CGR units/arrays/processors and/or memories, such as Ethernet networks/interfaces, I/O buses/interfaces, such as PCI-Express buses, InfiniBand buses/interfaces, and/or memory or data buses/interfaces, such as buses of a processor and/or memory fabric, and related interface hardware).

CGR hardware—As used herein, the terms "CGR hardware" and "CGR hardware resources" refer to any individual hardware element, or combination of hardware elements, of CGR components of a CGRS.

CGRS—a computing system comprising CGR units and/or CGRPs. As used herein, CGRS refers to a computing system that is based on, and/or can utilize, reconfigurable computing resources, such as CGR arrays, CGR units, and/or CGRPs, to perform operations of data parallel and/or dataflow applications. U.S. Nonprovisional patent application Ser. No. 16/239,252, "VIRTUALIZATION OF A RECONFIGURABLE DATA PROCESSOR", to Grohoski, et al, (hereinafter, "Grohoski"), and U.S. Nonprovisional patent application Ser. No. 16/922,975, "RUNTIME VIRTUALIZATION OF RECONFIGURABLE DATA FLOW RESOURCES", to Kumar, et al, (hereinafter, "Kumar"), both incorporated herein by reference, illustrate example implementations of CGR arrays, CGR units, CGRPs, and CGR systems.

Chip—As used herein, the term "chip" refers to an IC (or, combination of ICs) that can embody elements of a CGRA. A chip can typically be packaged in a chip module (e.g., a single chip module, "SCM" or, alternatively, a multi-chip module, "MCM").

Compiler—a translator that processes statements written in a programming language to machine language instructions for a computer processor. A compiler can include multiple stages to operate in multiple steps. Each stage can create or update an intermediate representation (IR) of the translated statements. Compiler stages are illustrated with reference to FIG. 3.

Computation graph/Graph—As used herein, computation graph refers to a type of directed graph comprising nodes and edges connecting the nodes, to represent a dataflow application. In a neural network application nodes can represent mathematical operations/expressions and edges that indicate dependencies between the operations/expressions. For example, in machine learning (ML) algorithms, input layer nodes can assign variables, output layer nodes can represent algorithm outcomes, and hidden layer nodes can perform operations on the variables. Edges can represent data (e.g., scalars, vectors, tensors) flowing between operations. In addition to dependencies, the computation graph reveals which operations and/or expressions can be executed concurrently.

Dataflow Application—As used herein, the term "dataflow" application refers interchangeably to data parallel and dataflow applications, such as ML, AI, and other massively parallel computing applications.

Dataflow Graph—a computation graph, or portion of a computation graph, corresponding to operators (application compute functions), data, and flow of data among operators, of a dataflow application that includes one or more loops of operator nodes that can be nested, and wherein nodes can send messages to nodes in earlier (predecessor) layers to control the dataflow between the layers.

IC—integrated circuit—a monolithically integrated circuit, i.e., a single semiconductor die which can be delivered as a bare die or as a packaged circuit. For the purposes of this document, the term integrated circuit also includes packaged circuits that include multiple semiconductor dies, stacked dies, or multiple-die substrates. Such constructions are now common in the industry, produced by the same supply chains, and for the average user often indistinguishable from monolithic circuits.

Intermediate Representation (IR)—an Intermediate Representation is a representation of an application in an intermediate langue. An IR can incorporate partial compilation results, such as sections (groupings) of a graph or model, pipelines that can be formed within a graph or model, mappings of application functions or graph nodes/edges to hardware resources of a CGRS.

Logical CGR—A logical CGR array or logical CGR unit comprises a representation of a CGR array or a CGR unit that is physically realizable, but that may not, at a particular time in executing a dataflow application, have been assigned to a physical CGR array or to a physical CGR unit on an IC.

ML—machine learning.

PEF—processor-executable format—a file format suitable for configuring a configurable data processor.

Pipeline—as used herein, the term "pipeline" refers to a set of two or more operators of a dataflow application that share tensor dimensions on which they can parallelize their computations. In a pipeline an output tensor of one operator in the pipeline and an input tensor of a successor operator in the pipeline have a common dimension on which they can parallelize their computations, such that the successor operator can input and utilize elements of the output tensor in parallel with the predecessor operator computing and outputting elements of the output tensor.

PNR—place and route—the assignment of logical CGR units and associated processing/operations to physical CGR units in an array, and the configuration of communication paths between the physical CGR units.

RAIL—reconfigurable unit abstract intermediate language.

RP—reconfigurable processor. An RP can comprise, for example, field programmable gate arrays (FPGAs), graphic processing units (GPUs), and/or CGRPs.

TLIR—template library intermediate representation (IR).

TLN—top-level network.

Turning now to more particular aspects of the disclosure, high-level programs for machine learning (ML) and artificial intelligence (AI) can require massively parallel and/or pipelined computations, where many parallel and interdependent computation threads exchange data. Such programs are ill-suited for execution on traditional, Von Neumann architecture computers. Rather, these applications can require architectures optimized for parallel and pipeline processing, such as CGRAs or graphic processing units (GPUs).

The ascent of dataflow applications such as ML and AI, and massively parallel architectures (such as CGRAs) places new and complex requirements to execute the applications, or computations of the applications, on CGR hardware. Such requirements can include how computations of an application are pipelined, which computations are assigned to which compute units, how data is routed between various compute units and memories, and how synchronization among processors, memories, and data transfer hardware is controlled, particularly when a dataflow applications includes one or more nested loops, whose execution time can varies depending on the data being processed. The architecture, configurability and dataflow capabilities of CGR systems, and CGR components of CGR systems, enable increased compute power that supports both parallel and pipelined computation.

In implementations CGR components of a CGRS, for example, can be programmed to simultaneously execute multiple independent and interdependent operations. To enable parallel execution of application computations, dataflow applications need to be distilled from a high-level program and translated to low level instructions to execute the program on hardware resources of reconfigurable dataflow systems, such as a CGRS. The low level instructions can comprise a configuration file describing a configuration of CGR components, as well as processor (e.g., CGRP) instructions and/or instructions for transferring application data among CGR components.

A high-level program is source code written in programming languages like Spatial, Python, C++, and C, and can use computation libraries for scientific computing, ML, AI, and the like. The high-level program and referenced libraries can implement computing structures and algorithms of machine learning models like AlexNet, VGG Net, GoogleNet, ResNet, ResNeXt, RCNN, YOLO, SqueezeNet, SegNet, GAN, BERT, ELMo, USE, Transformer, and Transformer-XL.

In computing applications, a compiler translates high-level programs to instruction executable by processors of a computing system. In a CGRS, a CGRS compiler can translate high-level programs to processor instructions, but also to executable instruction files and/or "bit files" describing configurations of CGR components to execute a dataflow application, or computations of a dataflow application. CGRS compilers require mapping application operations and data flow to CGR hardware components in both space (CGR hardware parallelism) and time (for synchronization of interdependent computations). This requirement implies that a CGRS compiler must determine which operations of a dataflow application are assigned to which of the CGR components, and how both data and, related to the support of computation and control information flow among CGR components, and to/from external hosts and storage. This process, known as "place and route", is one of many new challenges posed to CGRS compilers.

FIG. 1 illustrates an example reconfigurable dataflow computing system 100 including a CGR processor 110, a host 180, and a memory 190. CGR processor 110 has a coarse-grained reconfigurable architecture (CGRA) and includes an array of CGR units 120 such as a CGR array. CGR processor 110 further includes an IO interface 138, and a memory interface 139. Array of CGR units 120 is coupled with IO interface 138 and memory interface 139 via data bus 130 which can be part of a top-level network (TLN). Host 180 communicates with IO interface 138 via system data bus 185, and memory interface 139 communicates with memory 190 via memory bus 195. Array of CGR units 120 can further include compute units and memory units that connected with an array-level network (ALN) to provide the circuitry for execution of a computation graph or a dataflow graph that can have been derived from a high-level program with user algorithms and functions. The high-level program can include a set of procedures, such as learning or inferencing in an AI or ML system. More specifically, the high-level program can include applications, graphs, application graphs, user applications, computation graphs, control flow graphs, dataflow graphs, models, deep learning applications, deep learning neural networks, programs, program images, jobs, tasks and/or any other procedures and functions that can need serial and/or parallel processing. In some implementations, execution of the graph(s) can involve using multiple units of CGR processor 110. In some implementations, CGR processor 110 can include one or more ICs. In other implementations, a single IC can span multiple CGR processors. In further implementations, CGR processor 110 can include one or more units of array of CGR units 120.

Host 180 can be, or can include, a computer such as will be further described with reference to FIG. 11. Host 180 can execute runtime processes, as further referenced herein, and can also be used to run computer programs, such as a CGRS compiler. In some implementations, the compiler can run on a computer that is similar to the computer described with reference to FIG. 11, but separate from host 180.

CGR processor 110 can accomplish computational tasks by executing a configuration file (for example, a PEF file). For the purposes of this description, a configuration file corresponds to a dataflow graph, or a translation of a dataflow graph, and can further include initialization data. A compiler compiles the high-level program to provide the configuration file. In some implementations described herein, a CGR array is configured by programming one or more configuration stores with all or parts of the configuration file. A single configuration store can be at the level of the CGR processor or the CGR array, or a CGR unit can include an individual configuration store. The configuration file can include configuration data for the CGR array and CGR units in the CGR array, and link the computation graph to the CGR array. Execution of the configuration file by CGR processor 110 causes the CGR array(s) to implement the user algorithms and functions in the dataflow graph.

CGR processor 110 can be implemented on a single integrated circuit die or on a multichip module (MCM). An IC can be packaged in a single chip module or a multichip module. An MCM is an electronic package that can comprise multiple IC dies and other devices, assembled into a single module as if it were a single device. The various dies of an MCM can be mounted on a substrate, and the bare dies of the substrate are electrically coupled to the surface or to each other using for some examples, wire bonding, tape bonding or flip-chip bonding.

Many dataflow applications, such as in ML and other types of AI applications, comprise neural networks (NNs). Examples of neural networks include fully connected neural networks (FCNNs), recurrent neural networks (RNNs), graph neural networks (GNNs), convolutional neural networks (CVNNs), graph convolutional networks (GCNs), long short-term memory (LSTM) networks, autoencoders, deep belief networks, and generative adversarial networks (GANs).

In data parallel and dataflow applications, such as NNs, compute functions of the application are often referred to as "operators". The compute functions perform computations, such as tensor computations using tensor data of the application, to execute the higher level processes of the application (e.g., object recognition in an image, natural language phrase interpretations or prediction, etc.). A neural network processes data according to a flow of computational input (operand) and computational output (results) data through layers of operators (neurons) of the NN.

Operators of an input layer can receive stimuli (e.g., input data), and the input and other (e.g., "hidden") layers compute particular functions (e.g., an activation or loss function), and operators of an output layer output computational results. A particular layer of an NN comprises operators that perform the particular function computations of that layer. Example layers, and associated operators, of NNs include rectified linear unit (ReLU) layers, fully connected layers, recurrent layers, graphical network layers, long short-term memory layers, convolutional layers, kernel layers, dropout layers, and pooling layers.

A machine learning application requires "training" within a problem space the application is designed to recognize (e.g., subjects of images, audio, or video) or predict outcomes (e.g., natural language phrase completion, future values, etc.). Training a neural network can comprise determining and/or optimizing parameters associated with computations (e.g., activation functions) of the NN computed by operators within layers of the NN. Weights and biases, for example, can be parameters of a weights-bias activation function of a neural network. In training such an NN, a training (data parallel/dataflow) application can compute gradients of weights and biases, such as by using a loss-function, and can optimize the weights and biases based on an optimization algorithm such as gradient descent. Executing an ML application can utilize the optimized parameters to execute functions of the application.

Problem spaces of a machine learning application, and/or input of dataflow applications in general, can comprise enormous amounts of data, and can often comprise tensor data. Thus, functions of these applications (e.g., operators of neural networks) commonly involve linear algebra computations over tensor data, such as tensor multiplication, transposition, and addition. Algorithms commonly employed in dataflow applications include algorithms such as linear regression and gradient descent over tensors. Tensors data can comprise tensors of varying dimensions and a variety of computing systems, including dataflow computing systems, can perform tensor computations, such as GeMM, tensor summation, tensor transposition, gradient computations, and/or backpropagation of tensor computations, to process tensors in dataflow applications such as machine learning in neural networks.

As used herein, brackets and a capital letter, such as [M], is used to refer to a tensor as a whole, while lowercase letters, such as m, are used to refer to an element, or set of elements, of a tensor [M]. For example, an expression such as (w×a) refers, herein, to a multiplication of a set of elements of tensors [W] and [A], such as elements of a row of tensor [W] multiplied by elements of a corresponding column of tensor [A]. The term "element", in reference herein to a tensor, refers to the contents (e.g., a scalar value) of a row and column cell of the tensor.

A common computation for processing tensors in dataflow applications is a sum of products (dot product) of two tensors. The products comprise products of elements of a row of one multiplicand tensor (a "left side" tensor_multiplied by corresponding elements of a column of a second multiplicand (a "right side" tensor), where the row dimension of the left side tensor and the column dimension of the right side are the same (shared dimension.) As used herein, the term "dot product" refers to a sum of two or more products of a row of a left side tensor multiplicand by a column of a right side tensor. An expression such as (Σw a) refers to a sum-product of elements w and a (e.g., a sum of products w×a for elements of a row of a tensor [W] multiplied by elements of a column of a tensor [A]). As an example, a dot product of elements $w_{11}$ of tensor [W multiplied by an of tensor [A], and $w_{11}$ multiplied by $a_{21}$ of tensor [A], is $[w_{11}\times a_{11}+w_{11}\times a_{21}]$.

A "tensor summation" computation, as used herein, refers to a tensor computation in which a dot product of two multiplicand tensors is added to a tensor addend. A tensor addend can comprise a constant or can comprise a tensor (which can itself be multiplied by a tensor multiplied by a constant) sharing a row dimension of the dot product of two multiplicand tensors. A "weight-bias function", y=Σw a+b, is one example of such a computation, in which a weights tensor [W] is multiplied by an activation tensor [A] and the dot products, Σw a, for each row/column set of products, is added to elements of a bias tensor [B] . . . .

In implementations, a CGRP, and/or other CGR components of a CGRS, can perform computations (e.g., operators) of applications in a distributed fashion and/or can execute computations as pipelines that can efficiently exploit CGRS and application parallelism, and CGR component data locality. Pipelines of CGRS compute units (e.g., CGRPs and/or CGR arrays) can contain several computational stages, in which each stage can read data from one or more input buffers (e.g., buffers in CGR component memories), can perform computations on the data while using one or more internal buffers to store and retrieve intermediate results, can produce outputs, and can write the outputs to one or more output buffers.

Data parallel and dataflow computing applications can comprise tensor computations, usually involving enormous amounts of data, such as very large and/or numerous quantities of tensor data. For example, machine learning (ML) and other tensor-based applications can comprise a convolutional neural network (NN). While not intended to limit implementations, a convolutional neural network can serve to illustrate aspects of the disclosure. However, it will be appreciated by one of ordinary skill in the art that aspects of the disclosure can apply broadly to a variety of computing applications involving tensor data, and/or executed by data parallel and/or dataflow applications and computing systems.

An NN can comprise layers organized as a pipeline of computations using tensor data. A layer of the NN can comprise operators performing computations on tensor data. A particular operator of an NN (or, tensor-based application in general) can perform a tensor computation, such as Generalized Tensor Multiplication ("GeMM"), tensor convolution, and Rectified Linear Units ("ReLU") corresponding to particular algorithms and/or functions of the application, such as an activation function, gradient descent function, and/or a loss function. A particular layer of an NN can comprise multiple processing elements, such as CGRPs, executing in parallel to perform operator computations of the application using subsets of tensor data. The processing elements of one layer of an NN can output results of their computations to a successor "forward" and/or "backward" layer of the NN.

Various types and/or combinations of computing systems can execute tensor-based applications, and/or operators of tensor-based applications, such as NNs. Data parallel (DP) and dataflow computing systems, particularly systems utilizing CGRPs, can be particularly efficient at executing tensor-based applications. CGRPs can individually, or in combination, execute functions and/or computations of application operators, in parallel and in pipelines, to efficiently execute an application and improve performance of application execution. As used herein, the term "reconfigurable dataflow system (DS)" refers, interchangeably, to data parallel and dataflow computing systems utilizing reconfigurable processors such as CGRPs. An RDS can, for example, efficiently execute tensor-based applications such as convolutional neural networks, and can serve to illustrate aspects of the disclosure without limiting implementations.

A tensor-based application can include "operators" that perform computations such as linear regression, non-linear regression, Gaussian regression, Support Vector Machine (SVM) regression, Generalized Linear Models, regression trees, shallow and deep neural network models, logistic regression, decision tree, and, "K" nearest neighbor, using tensor data. One expression, or representation, of an application is a computation graph (hereinafter, for brevity, simply "graph"), which can be textual, graphical, or a combination of textual and graphical descriptions of operators, operands, and results of computations of the application. A graph can represent the operators (as compute nodes of the graph) of an application, and their arrangement and/or dependencies (e.g., flow of computational inputs and outputs) among the operators (as edges of the graph).

Data nodes of a graph can represent particular application data elements, such as input data for training an ML model. A graph can be a directed acyclic graph (DAG), or can comprise loops, and even nested loops, of operators. As used herein, except where otherwise qualified as "data node", the term "node" is used herein interchangeably to refer to an operator of an application and a node representation of that operator in a graph.

Forward nodes of a graph can receive outputs of backward nodes (e.g., gradients), and backward nodes can receive updated outputs of forward nodes (e.g., outputs computed using outputs of backward nodes), creating feedback loops within the graph. As nodes within a feedback loop recompute outputs based on the feedback, such nodes are referred to herein as "recompute nodes".

A pipeline can comprise a set of forward operators and, optionally, set of backward operators (e.g., backpropagation operators). Each operator within a pipeline can process data output from a predecessor operator in parallel with the predecessor operator computing and outputting results of computations over a portion input data.

FIG. 2 illustrates an example of a computation graph corresponding to an application. As shown in FIG. 2, forward and backward operators of an application can be grouped, such as for mapping the operators to CGR components for execution, as respective forward and backward sections of a graph. The sections can each represent nodes of the graph that do not have data dependencies among each other (that is, do not need to await complete computational results of another compute node), such that a CGRS can execute computations of the nodes in a pipeline topology among CGR components. Sections can particularly comprise operators that can form a pipeline. As described in the definition of a pipeline, operators of a pipeline share a dimension of their respective output and input tensors on which they can parallelize their computation. For example, a GeMM operator that computes and outputs an M×N tensor and an ADD operator that inputs the GeMM output operator to add to an M×1 addend tensor (e.g. a bias tensor) shared dimension M and can form a pipeline (or, a portion of a pipeline of more than two operators). That is, based on the shared dimension, M, of the GeMM output and ADD addend tensors, the ADD operator can input elements of the GeMM output tensor and compute a sum using those elements in parallel with the GeMM operator computing and outputting additional output elements.

In FIG. 2, forward sections 210 is shown comprising Pipe 214A and Pipe 214B, and backward sections 220 is shown comprising Pipe 224A and Pipe 224B. Pipe 214A is shown comprising node CONV 212A, and Pipe 224B is shown comprising nodes RELU 212B, CONV 212C, RELU 212D, and MAXPOOL 212E (hereinafter, collectively "nodes 212). Names of nodes, such a "RELU", can indicate a type of computation of the application performed by a node.

Edges of a graph can represent data flow between and into or out of the nodes. Thus, computational results of node CONV 212A can flow as inputs to node RELU 212B, computational results of node RELU 212B can flow as inputs to node CONV 212C, and so forth. Data nodes in a graph can represent data processed by compute nodes and flow of data into or out of the nodes (as also shown in FIG. 2 by directed arrows). In forward sections 210, FIG. 2 depicts data nodes OP DATA 202 and WEIGHT 204 as data input to CONV 212A, and WEIGHT 206 as data input to CONV 212C.

In FIG. 2, backward sections 220 is shown comprising Pipe 2224A and Pipe 224B, Pipe 224A is shown comprising nodes CONV2D BWD 222A and RELU BWD 222B, and Pipe 224A is shown comprising nodes CONV2D BWD 222C, RELU BWD 222D, and MAXPOOL 222E. In backward sections 220, FIG. 2 depicts data node WEIGHT 206 as data input also to CONV2D BWD 222C. Backward nodes of a graph can represent nodes that receive outputs of forward nodes and compute a feedback function over those outputs. For example, a common backward computation is to compute gradients of weights and biases, and/or loss functions based on gradients of weights and biases, in a weights-bias activation function of a forward node. Backward nodes, can compute, for example, a gradient in an application that include gradient descent to optimize computations of forward nodes in a feedback loop. As shown, an output of backward sections 220 is data node output gradient 208, output node CONV2D BWD 222A.

In implementations, a "CGRS compiler" can compile a high-level language representing of a data parallel and/or dataflow application to configurations and/or execution instructions to execute the application. For brevity, hereinafter "application" is understood to refer to a data parallel or dataflow programming application for execution by a data parallel and/or dataflow computing system, such as a CGRS.

A CGRS compiler can, for example, transform an application into, and/or can utilize, a graph such as example graph 200 in FIG. 2. Based on a graph of an application, a CGRS compiler can generate a search space, and can use the graph and/or search space to determine model operational parallelism and pipelining, and/or to map model dataflow (e.g., nodes and edges of a computation graph) to CGRS and/or CGR hardware resources and dataflow through the resources. A compiler can further transform resource mapping decisions into assembler input for generation of hardware instructions and/or hardware configuration files, such as a Processor Executable Format (PEF) file.

Figure 3:
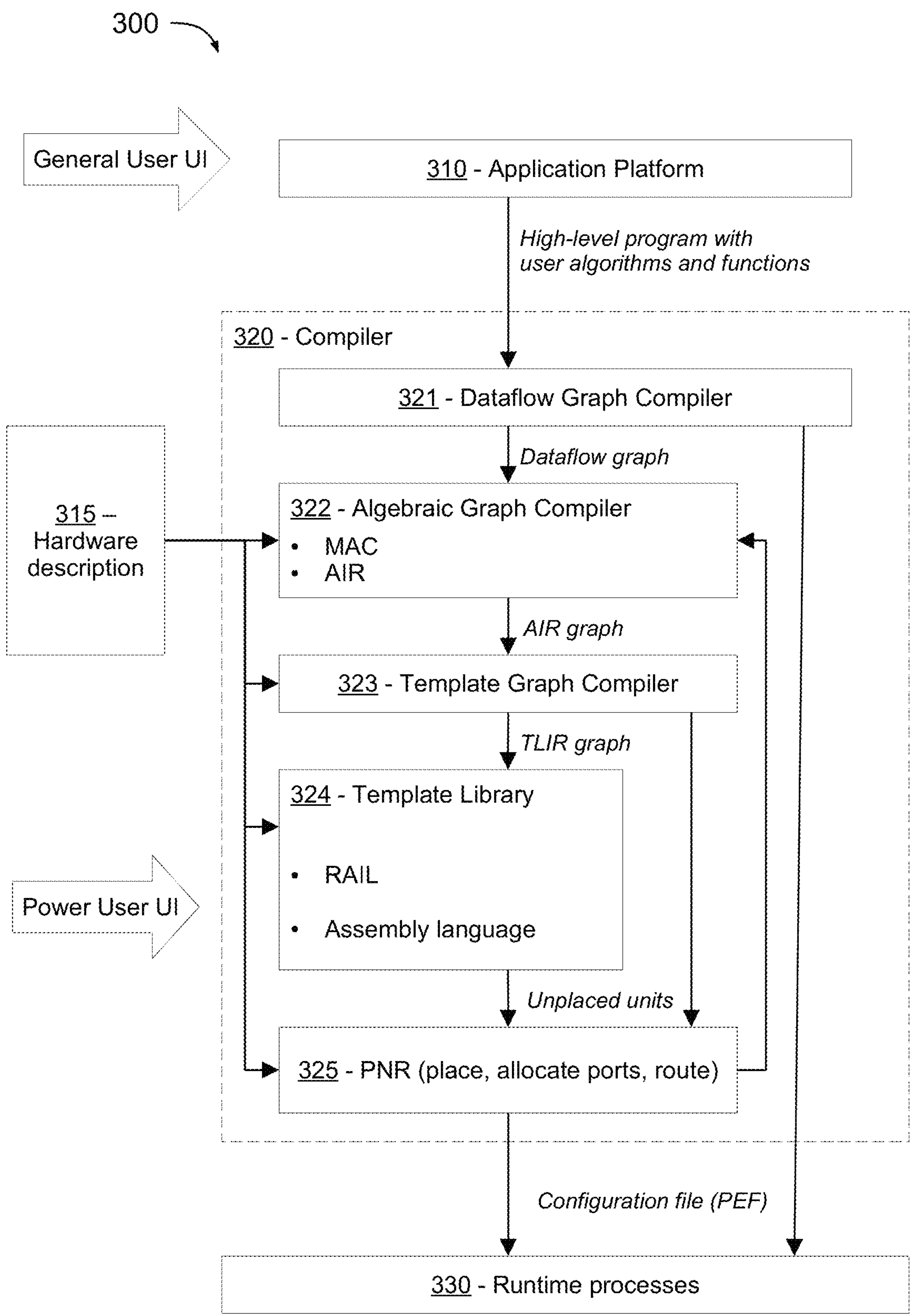
FIG. 3 illustrates an example compiler stack, according to aspects of the disclosure.

FIG. 3 is a block diagram of example compiler stack 300 comprising multiple compilation stages to compile a dataflow application for execution by a CGRS. As depicted in FIG. 3, compiler stack 300 includes several stages to translate a high-level program, with (user) dataflow application algorithms and functions (e.g., ML algorithms and/or tensor computation functions), to configuration and/or instruction data for a CGRS to execute the application.

Compiler stack 300 can take its input from application platform 310, and/or any other source of high-level program statements of an application, which provides a user interface, such as an API and/or command line interface (CLI), for application developers to compile an application. A "user", as used herein, can be any human or computing system that develops an application (e.g., programs the high-level programs of an application), and/or that can input an application into a CGRS compiler for translation to CGRS configurations and/or CGRS execution instructions.

Compiler stack 300 can further receive hardware description 315, which can comprise a textual and/or graphical description of CGRS and/or CGR hardware components of a CGRS. Compiler stack 300 can utilize hardware description 315 to translate the high-level programming statements of an application to configurations CGR components and/or execution instructions (e.g., instructions to a runtime processor to control execution, and/or processor instructions to execute functions, of an application) to execute the application.

Application platform 310 can comprise a computing system for developing an application and/or inputting an application for compilation by a CGRS compiler. For example, application platform 310 can comprise a computing system capable of hosting a user, such as host processor in the CGRS examples of Kumar. Application platform 310 can include libraries such as PyTorch, TensorFlow, ONNX, Caffe, and Keras to provide user-selected and configured algorithms.

Application platform 310 can output a high-level program of an application to compiler 320, which in turn can output a configuration file to runtime processes 330. Runtime processes 330 can comprise programs to configure CGR components, and/or manage execution of an application on CGR components, of a CGRS. The programs can execute on a runtime processor (e.g., one or more CPUs) of a CGRS.

Compiler 320 can include dataflow graph compiler 321, algebraic graph compiler 322, template graph compiler 323, template library 324, and placer and router PNR 325. In implementations, template library 324 can include a reconfigurable unit abstract intermediate language (RAIL), and/or assembly language interfaces (APIs) for power users.

Dataflow graph compiler 321 can analyze high-level programs, implementing user algorithms and application functions received from application platform 310, and can convert the high-level programs to one or more dataflow graphs. The high-level programs can be suitable for parallel and/or pipeline processing and nodes of the dataflow graphs can be intrinsically parallel unless an edge in the graph indicates a dependency. Dataflow graph compiler 321 can provide code optimization steps, such as false data dependency elimination, dead-code elimination, and numeric constant folding. The dataflow graphs can encode data and execution control dependencies of the high-level programs.

Dataflow graph compiler 321 can support programming a CGR components (e.g., CGRPs) using higher or lower-level programming languages, For example dataflow graph compiler 321 can support translation or conversion from an application platform 310 to C++ and/or an assembly language. In implementations, dataflow graph compiler 321 can allow programmers to provide code (e.g., machine language code) that runs directly on CGRPs and/or other CGR components. Dataflow graph compiler 321 can include one or more programming libraries, and the libraries can include predefined functions, such as linear algebra operations, element-wise tensor operations, non-linear functions, and reduction functions for creating, executing, and profiling dataflow graphs on the CGRPs. Via the application platform 310, dataflow graph compiler 321 can provide an API to enhance programming functionality available to application developers.

Algebraic graph compiler 322 can include a Model Analyzer and Compiler (MAC) level that can make high-level mapping decisions for sub-graphs (also referred to as "sections" or "section cuts") of a dataflow graph based on CGR hardware constraints. Algebraic graph compiler 322 can support various application frontends, such as Samba, JAX, and TensorFlow/HLO. Algebraic graph compiler 322 can also transform the graphs, for example via autodiff and GradNorm, to perform stitching between sub-graphs, interface with template generators for performance and latency estimation, convert dataflow graph operations to algebraic intermediate representation (AIR) operations, perform tiling, sharding (database partitioning) and other application preparation operations, and can model or estimate execution parallelism that can be achieved within the dataflow graphs.

Algebraic graph compiler 322 can include an arithmetic or algebraic intermediate representation (AIR) level that can translates high-level dataflow graph and mapping decisions provided by a MAC level into AIR graphs. An AIR level can include validating and/or correcting ("legalizing") a dataflow graph and/or mapping decisions of a MAC; expanding data parallel, tiling, pipeline, and/or region instructions provided by a MAC; inserting stage buffers and skip buffers, eliminating redundant operations, buffers, and sections; and, optimizing resource use, execution latencies, and computational throughput.

Template graph compiler 323 can translate AIR graphs to a template library intermediate representation (TLIR). A TLIR can comprise a graph that can optimize configurations and/or execution instructions based on target (CGRS and/or CGR) hardware architecture and/or to unplaced units suitable for place, allocate, and route level PNR 325. Template graph compiler 323 can add further information node names, node inputs, node input names, and dataflow descriptions) as inputs to PNR 325, and can make the graph physically realizable through each layer of the graph. Template graph compiler 323 can, for example, translate AIR graphs to specific application operation templates, such as templates for general tensor multiplication (GeMM), tensor transposition, and/or tensor convolution operations. In implementations a CGRS compiler like compiler 320 a can convert part or all intermediate representation operations to templates, stitch templates into data and control flow of the application, insert necessary buffers and layout transforms, generate test data, and optimize for CGR hardware utilization, execution latency, and compute and/or data transfer throughput.

Implementations can use templates for common operations. Templates can be implemented using assembly language, RAIL, or similar language and/or representation constructs. RAIL can compare to a low-level language, in that memory units and compute units can be separately programmed in RAIL constructs, but RAIL can provide a higher level of abstraction and compiler intelligence that, for example, an assembly language, via a concise performance-oriented and domain-specific language for CGR component (e.g., CGR array) templates. RAIL can enable template writers and external power users to control interactions between logical compute units and memory units of CGR components using high-level expressions, without the need to manually program actions such as capacity splitting, register allocation, etc. RAIL logical compute and memory units can also enable stage/register allocation, context splitting, transpose slotting, resource virtualization and mapping to multiple physical compute units and memory units (e.g., PCUs and PMUs of tiles, such as in the examples of Grohoski and Kumar).

Template library 324 can include an assembler that provides an architecture-independent, low-level programming interface as well as optimization and code generation for CGR hardware. An assembler can include memory address expression compilation, CGR hardware intra-unit resource allocation and management, rendering a template graph physically realizable based on CGR hardware-specific rules, low-level CGR hardware architecture-specific transformations and optimizations, and CGR hardware architecture-specific code generation.

PNR 325 can translate RAIL and/or assembly language outputs of template library 324, and/or TLIR outputs from template graph compiler 323, and can map logical (e.g., unplaced physically realizable) CGR units, to physical CGR hardware implementation levels, such as an SCM, MCM, and/or chip level of CGR components, can determines physical data channels to allow for communication among the CGR units and between the CGR components (e.g., components coupled via a TLN, allocate memory, I/O, and/or switch ports of CGR components, provide CGR component configuration data and initialization data, and can produce configuration files, e.g., processor-executable format (PEF) files. PNR 325 can provide bandwidth calculations, allocate network interfaces, provide configuration data for CGR components to perform memory address translation, and control switch and data routing among CGR components. PNR 325 can perform such functions in multiple steps and can include multiple modules (not shown in FIG. 3) to perform the multiple steps, e.g., a placer, a router, a port allocator, and a PEF file generator). PNR 325 can receive input data, for example, from any of the higher-level modules (dataflow graph compiler 321, algebraic graph compiler 322, template graph compiler 323, and/or template library 324). In implementations, a higher-level module, such as template graph compiler 323, can prepare information for PNR 325 and can omit other levels directly providing input data to PNR 325.

Implementations of compiler 320 compile applications in an iterative process, such as feeding information from PNR 325 back to a higher-level module, which can, in turn, execute a new compilation step using physically realized results, rather than estimates of, or logical placeholders for, physically realizable circuits. For example, PNR 325 can feed information regarding the physically realized circuits back to algebraic graph compiler 322.

Memory allocations can represent logical memory spaces in on-chip (a chip implementing a CGR component) and/or off-chip (a chip separate from a CGR component), CGR component memories, for data flowing through the dataflow graph; a configuration file, such as a PEF, can specify particular memory allocations. Memory allocations can define a type and number of CGR hardware memories and/or circuits (functional units, storage, or connectivity components). Main memories (e.g., DRAM) can be, for example, off-chip memories, and scratchpad memories (e.g., SRAM) can be on-chip memories, such as memories of a CGR array. Memory allocations can correspond to various access patterns and/or memory layouts, such as access patterns/layout of cache memories, read-only look-up tables (LUTs), serial memories (e.g., FIFOs), and/or register files.

Compiler 320 can bind memory allocations to unplaced memory units and can bind operations of a dataflow graph to unplaced compute units, for execution of a graph, and configuration data, such as in a PEF, can specify such bindings. In implementations, compiler 320 can partition parts of a dataflow graph into memory subgraphs and compute subgraphs, and can specify these subgraphs in configuration file. A memory subgraph can comprise, for example, address calculations leading up to a memory access. A compute subgraph can comprise, for example, compute operations (compute nodes) in a parent graph. A compiler can divide a parent graph into multiple memory subgraphs and a single compute subgraph, for example. A single parent graph can produce one or more memory subgraphs, depending on how many memory accesses exist in the original graph loop body. In cases where the same memory addressing logic is shared across multiple memory accesses, a compiler can duplicate address calculations to create multiple memory subgraphs from the same parent graph.

Compiler 320 can generate configuration files with configuration data (e.g., a bit stream) for the placed positions, and for routed data and control networks. In implementations this can include the compiler assigning coordinates and communication resources of the physical CGR components by placing and routing unplaced units of CGR components with a goal to maximize compute and/or data transfer bandwidth and minimizing compute and/or data transfer latency.

An application may not itself include backward nodes and, in implementations, a CGRS compiler, such as illustrated by the example of compiler 320, can determine that a model requires backward nodes, and can generate backward nodes in a computation graph. In determining a mapping of an application to CGR hardware resources, a CGRS compiler can identify recompute nodes and can determine section boundaries among forward nodes, backward nodes, and recompute nodes within a graph.

To exploit the full power of a CGRS—particularly, dynamically reconfigurable CGR components of a CGRS—a CGRS compiler must not only generate low level processor instruction sequences, but must also allocate reconfigurable resources of the underlying CGR hardware that can execute the application most efficiently, and with highest possible computational performance. A CGRS compiler must, further, determine controls to sequence transfer in (e.g., to a memory and/or compute unit), processing (e.g., compute unit and/or operator pipelining), and/or transfer out (e.g., from a memory and/or compute unit) of application data.

In optimizing parallelization and computational latency of among CGRS hardware resources, a CGRS compiler must consider complex factors, such as: the number of available processing units (e.g., processors of CGR components); the number, size, and transfer latency of memory units (e.g., memories of CGR components); computational latency of operators of the application; dependencies among operators; and, sections of an application that can execute in parallel, not only intrinsically, but also given the amount of CGRS hardware resources available to execute the sections. Such considerations can be referred to as "mapping factors".

In implementations a "mapping decision space" can comprise mapping factors. In addition, or alternative, to factors just described, the mapping factors can include parameters and/or attributes of an application and/or CGRS related to mapping factors. Mapping factors included in a mapping decision space can include, for example, descriptions and/or attributes of CGR components; configurations and/or arrangements of data nodes, compute nodes, and interconnections of nodes (edges) of a graph and CGR components; and/or, groupings ("section cuts") of operators of a graph into particular pipelines and sections. Mapping factors of a mapping decision space can include alternative such configurations and section cuts, and can include costs (e.g., hardware utilization, compute and/or data transfer bandwidth or latency) associated with the alternatives. Mapping factors of a mapping decision space can include optimization goals (e.g., optimizing utilization over latency, or vice versa) and/or priorities of execution of particular nodes of a graph.

Mapping decisions can comprise tiling alternatives to apply to input/output tensors, alternative groupings of operators within pipelines and/or sections, and "PAR" (parallelization) factors associated with parallel execution of operators among alternative pipelines and/or section cuts. Mapping decisions can comprise, or be based upon, performance characteristics of mapping alternatives, such as computational latencies and/or CGRS hardware utilizations associated with different mapping decisions. Mapping decisions can include pipeline, tiling, and/or section cut options that can optimize particular performance characteristics (e.g., mapping decisions that can be preferred to optimize a particular performance characteristic of executing the application on CGRS hardware).

Figure 4A:
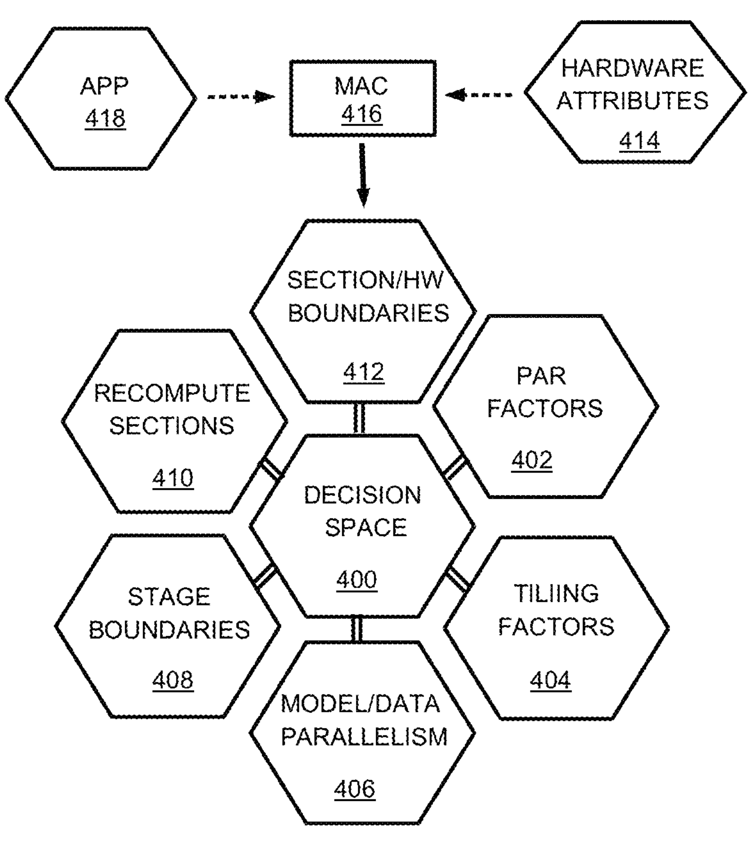
FIG. 4A illustrates an example mapping decision space, according to aspects of the disclosure.

FIG. 4A illustrates mapping factors and a mapping decision space a CGRS compiler can utilize in mapping operators and data of an application to underlying hardware resources of a CGRS (e.g., CGR components of a CGRS). A MAC component of a CGRS compiler, for example, can generate and/or analyze a computation graph of an application to determine mapping factors of a mapping decision space. For example, a MAC can traverse a graph, such as in the example of FIG. 2, to determine mapping factors of a mapping decision space.

In implementations, a compiler can determine a mapping of an application (e.g., operators and tensors included in a graph of an application) to CGR hardware resources for execution of the application. A compiler, or a MAC of a compiler, can include a hardware mapping component—referred to herein as a "mapper"—and the mapper can analyze a graph to map operators, tensors, and/or tensor dataflow of an application to CGR hardware for execution.

For purpose of illustrating the disclosure, example operations of the disclosure, such as example operations of FIG. 4A, are frequently described as performed by a MAC, and/or components of a MAC, of a CGRS compiler. However, this not intended to limit implementations and one of ordinary skill in the art will appreciate that a compiler need not necessarily comprise a CGRS compiler, a MAC of a CGRS compiler, and/or particular components (e.g., a mapper) of a compiler or a MAC to perform methods, and/or steps of methods, of the disclosure. Components of a compiler alternative to these particular components can perform methods and operations of the disclosure within the scope and spirit of the disclosure.

In FIG. 4A, decision space 400 is an example of a mapping decision space that a CGRS compiler can utilize to determine alternatives to map an application to CGR hardware for a CGRS to execute the application efficiently. Decision space 400 can represent a combination (not necessarily exhaustive) of mapping factors 402-412 (collectively, "mapping factors 400" in FIG. 4A) that a CGRS compiler can include in a mapping decision space such as example decision space 400.

In FIG. 4A, app 418 can comprise an application, and/or application model, (e.g., represented as a graph and/or textual representation) and MAC 416, in FIG. 4A, can be a MAC component of a CGRS compiler configured to compile app 418. MAC 416 can generate decision space 400 to execute app 418 on CGR hardware that can be represented by hardware attributes 414. In the example of decision space 400, mapping factors 400 are shown in FIG. 4A including PAR factors 402, tiling factors 404, model/data parallelism 406, stage boundaries 408, recompute sections 410, and section/HW boundaries 412.

PAR factors 402 can comprise, for example, parallelization ("PAR") factors included in a template (e.g., a template among template library 324 in FIG. 3) that can represent an intrinsic, or application programmer preferred, parallelization of model operators. Tiling factors 404 in decision space 400 can include alternative, and/or optimal, tiling of operator and/or pipeline input data, operand tensors, and/or operator results tensors. Tiling a graph refers to partitioning, or "slicing", input/output tensors input to, and output from, operators in the graph into smaller tensors ("tiles"). A MAC can tile the tensors based on, and/or to preserve, a particular, shared dimension of the tensors (e.g., a row dimension or a column dimension of the tensors). Model/data parallelism 406 can include boundaries of operator and data parallelism, which can represent, for example, a degree of parallelization of model operators and data. Stage boundaries 408 can include, for example, boundaries of pipeline stages of underlying CGRS and/or CGR component hardware.

As illustrated in the examples of FIG. 2, a model can comprise sections. Operators that cannot be executed in parallel (e.g., operators that cannot be included in a pipeline with another operator) cannot be included in the same section of an application. Similarly, underlying CGR hardware can have limits to the number and/or type of operators that it can perform in parallel, and/or the amount of data it can process (e.g., based on sizes of memory to buffer or store input data and/or computation outputs). Thus, section/HW boundaries 412 can include boundaries, within a model or graph of a model, between forward and backward sections of the model, and/or boundaries of CGR hardware to execute operators within particular sections of a graph. Hardware boundaries among section/HW boundaries 412 can be based on a hardware description, and/or attributes of hardware, of CGR hardware, such as can be included in hardware attributes 414.

Backward nodes can be feedback paths, in the model, to recompute nodes, and the recompute nodes can be factors of decision space 400, such as to determine dependencies among sections and operators within sections. Recompute sections 410, for example, can represent combinations of operators that recompute particular application functions, such as recomputing activation functions using results (e.g., gradient adjusted tensors) of backward section operators.

In implementations, a compiler can represent an application, and/or a graph, using high level language (HL), intermediate level (IL), and/or low level (LL) language constructs and/or statements that can represent operators, input/output tensors of operators, and/or interconnections of the nodes and/or allocation of CGR hardware to execute the application. HL, IL, and/or LL representations can be, or can represent, an application graph or model. HL, IL, and LL language constructs/statements can describe nodes and edges of a graph, and/or instructions for executing the graph (i.e., executing the application as represented by the graph) on CGR hardware. HL, IL, and/or LL language constructs and/or statements can include compiler generated mapping alternatives and/or decisions as to how to map the application to CGR hardware for execution.

A compiler can generate a high level graph representation ("HLR") of an application. The compiler can utilize an HLR, for example, to analyze overall execution elements of the application, and/or to determine initial alternatives for mapping operations of the application to CGR hardware, such as tiling, section cut, and/or parallelization factors in mapping the application.

A compiler can generate, for example, an IL representation (ILR) of the graph that can incorporate mapping alternatives and/or decisions. For example, a compiler can translate an HL graph into an ILR such as an AIR graph and/or a TLIR graph. A compiler can compile, or translate, an ILR to an LL representation (LLR), such as a RAIL representation, that can describe configuration and/or execution instructions to execute the application using particular CGR hardware and/or configurations. The LLR can be suitable for generating application execution code specific to the CGR hardware, such as a PEF and/or configuration files. An ILR and/or LLR can be textual and or graphical, and can be another form of an application, or subset of an application.

A compiler can analyze graphs to determine execution parameters corresponding to CGR hardware allocated to execute the application. For example, a compiler can analyze an ILR (e.g., AIR) or LLR (e.g., RAIL) to determine execution latencies, processor/memory utilizations, and various other such metrics of application execution based on an IL or LL graph that includes CGR hardware resource allocations and/or execution on CGR hardware.

Figure 4B:
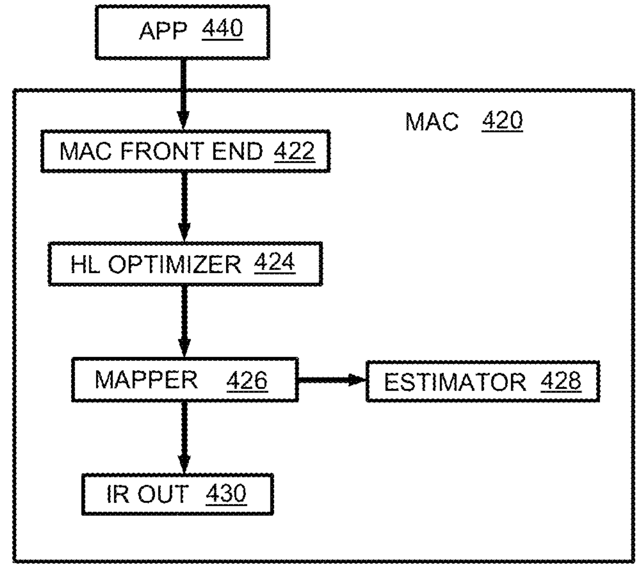
FIG. 4B illustrates an example structure of a model analyzer and compiler, according to aspects of the disclosure.

FIG. 4B illustrates example MAC 420, which can provide functions of a MAC such as MAC 416 in FIG. 4A. FIG. 4B depicts MAC 420 comprising MAC front end 422, HL optimizer 424, mapper 426, IR out 430, and estimator 428. In implementations, MAC front end 422 can comprise, for example, an API to input an application and/or application programming statements to compile for execution by a CGRS, shown in FIG. 4B as app 440. MAC front end 422 can comprise interfaces and/or functions to access hardware descriptions of the CGRS, to access or interact with other components of a compiler that includes MAC 420, and/or to access or interact with components of a host processor and/or the CGRS. MAC front end 422 can convert an application or application, such as app 440, to a graph and/or an intermediate representation (IR), for MAC 420 to determine mapping decisions to execute app 440.

HL optimizer 424 can perform high level optimization of app 440 and/or a graph of app 440, such as fusing operators (nodes) of a graph into higher level operators, eliminating no-ops and/or redundancies within app 440, and/or compute derivatives (e.g., Autodiff). In implementations, a compiler can determine a mapping of an application (e.g., operators and tensors included in a graph of an application) to CGR hardware resources for execution of the application. Mapper 426 can be a mapper component or function of MAC 420 that can determine mapping decisions to include in a mapping decision space, such as tiling, section cut, and/or parallelization decisions for mapping app 440 to CGR hardware for executing app 440.

Mapper 426 can utilize estimator 428 to determine, for example, model execution metrics such as computational latencies of CGRPs executing operators of app 440, data transfer latencies among memories of CGR hardware (e.g., memories of CGRPs executing operators of app 440), computational throughput among CGRPs executing operators of app 440, and/or amounts of memory required for input/output tensor data of operators of app 440. Mapper 426 can output mapping decisions to IR out 430 and IR out 430 can translate, or otherwise convert, the mapping decisions to an intermediate representation of app 440 that includes mapping decisions to execute app 440 on the CGR hardware.

Figure 5:
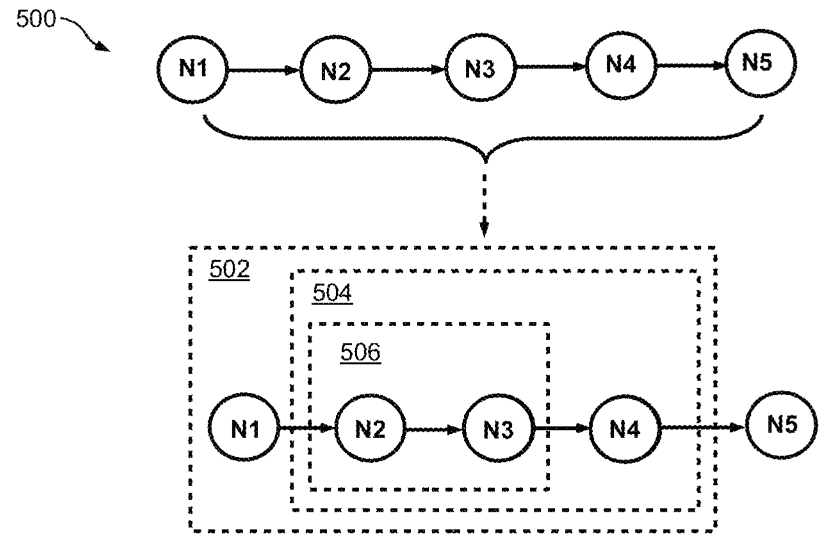
FIG. 5 illustrates an example graph comprising pipelines, according to aspects of the disclosure.

As pipelining operations of a dataflow application is an essential aspect of executing the application on CGR hardware, FIG. 5 illustrates an example portion of a graph that can form pipelines among operators in the graph. In FIG. 5, graph 500 is shown comprising operator nodes N1, N2, N3, N4, and N5 connected by directed edges shown as arrows from one node to another in FIG. 5. If an output tensor of one operator in a graph can share a dimension with an input tensor of another operator that takes the output tensor data, the two operators can potentially form a pipeline based on that shared dimension.

Figure 6:
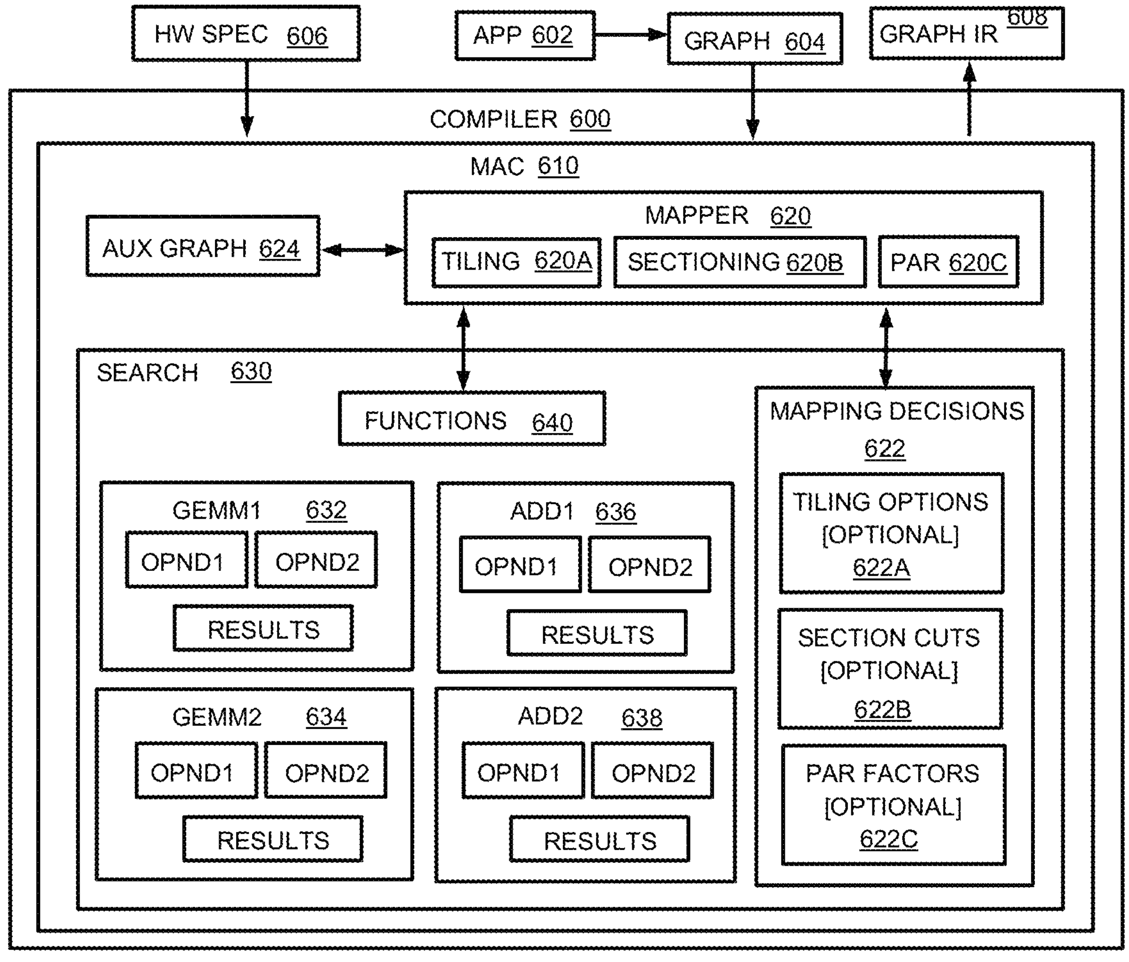
FIG. 6 illustrates an example CGRS compiler, according to aspects of the disclosure.

FIG. 5 illustrates example pipelines of nodes N1-N5 based on shared dimensions of the nodes' input and output tensors. As will be discussed in reference to FIG. 6, a compiler can analyze a graph to identify dimensions on which successive operators of the graph can parallelize their computations in a pipeline. The compiler can, as illustrated in the examples of FIG. 6, associate dimensions of input/output tensors with a "named dimension" (or, "Named DIM"). Tensors having dimensions with the same Named DIM can potentially form pipelines based on the shared dimension corresponding to that Named DIM.

In FIG. 5, suppose that all of nodes N1-N4 have input and output tensors having multiple (e.g., 3) dimensions. Where a dimension of an output tensor of one node and a dimension of an input tensor of another (successor) node share the same Named DIM (that is, share on dimension, among the dimensions of their respective input/output tensors) the nodes (operators) can perform computations in parallel to form a pipeline. In FIG. 5, pipeline 502 represents a pipeline comprising nodes N1-N4, but not N5. In this example, nodes N1-N4 can form pipeline 502 based on a shared dimension (e.g., a dimension having the same Named DIM, say DIM "A") among the dimensions of their respective output/input tensors. However, in this example N5 can have input tensors that do not share DIM A, or any other dimension, with tensors of node N4, such that N5 cannot be included in pipeline 502 or any pipeline based on DIM A.

Nodes of a pipeline can form nested pipelines (pipelines within another pipeline) based on different dimensions among their output/input tensors. As illustrated by the example of FIG. 5, pipeline 502 can comprise nested pipeline 504, and pipeline 504 can comprise nested pipeline 506. Each of pipelines 502, 504, and 506 can be pipelines based on shared tensor dimensions different from that of other pipelines. For example, while pipeline 502 can be a pipeline formed based on shared dimension DIM A, pipeline 504 can be a pipeline formed based on DIM "B", which can be shared among tensors of nodes N2, N3, and N4 but not tensors of nodes N1 and N5. Pipeline 506 is shown comprising nodes N2 and N3, which can be a pipeline formed on dimension DIM "C" shared among tensors of nodes N2 and N3 but not shared by tensors of nodes N1 and N4.

While not shown in the example of graph 500, a node can output tensors to multiple other nodes of the graph (e.g., graph 500 can be a subgraph of a larger application graph that includes operator nodes in addition to those shown in graph 500, and nodes of graph 500 can output tensors to those additional nodes). Thus, nodes among nodes N1-N4 can output tensors to other operators not shown explicitly in graph 500; further, nodes N1-N4 can be included in pipelines based on shared dimensions of tensors of those other nodes.

A "scope" of a pipeline can correspond to the set of operator nodes that can form the pipeline. For example, in FIG. 5 pipeline 502 has a scope comprising operator nodes N1-N4, pipeline 504 has a scope comprising operator nodes N2-N4, and pipeline 506 has a scope comprising operator nodes N2 and N3. However, as a node can be included in only one pipeline at any time for executing the operators in a pipeline, two pipelines cannot have the same scope to execute the operators.

As neural networks form the basis of many dataflow applications, neural networks can represent useful applications to illustrate the disclosure, and examples and descriptions of the disclosure make frequent reference to NNs as an example application. However, this is not intended to limit implementations and one of ordinary skill in the art will appreciate that the scope and spirit of the disclosure, and the methods and/or structures of the disclosure, can encompass user applications suitable for execution on CGR systems other than NNs.

In implementations, a MAC can analyze an application (e.g., a graph of the model) to determine mapping factors included a mapping decision space, such as mapping factors in decision space 400 of FIG. 4A. A MAC can analyze an application or graph to determine operators that can form pipelines, and alternative pipelines, and associated sections including the pipelines, and can include the pipelines in a decision space (e.g., among section and HW boundaries 412 of decision space 400 in FIG. 4).

In implementations, applications, and corresponding graphs, can comprise tens of thousands of operators, and/or billions or even trillions of input/output tensor elements, executable on CGR hardware. Thus, mapping an application (e.g., mapping a graph) to CGR hardware can require substantial computation time and complexity. To improve efficiency of a CGRS compiler (e.g., a mapper) determining mappings—particularly, optimized mappings—of a model to CGR hardware, a CGRS compiler can generate a search space representing data and compute nodes of a graph, and their relationships (e.g., source and destination nodes within operator dataflows of the graph, as represented by edges of the graph). A search space can comprise attributes of operators, input/output tensors, such as operator type, dimensions of input/output, size (e.g., number of elements) of input/output dimensions, and so forth. Using a an API of a search space, a mapper can, for example, identify operators, and their associated input/output tensors, that can form such a pipeline (or, pipelines).

One example of a search space representing an application, or computation graph of an application, is a "Dimension-Based Search Space (DBSS). A DBSS can, in particular, represent operators, and/or operator inputs and outputs, and various attributes of these, based on dimensions of operator operands and/or results tensors in a graph. A DBSS can associate Named DIMs with dimensions of input/output tensors and the Named DIMs can operate as a query key, or parameter, to determine operators and tensor dimensions of operators, in a graph.

U.S. Provisional Patent Application No. 63/327,313 filed Apr. 4, 2021, entitled "SEARCHING NEURAL NETWORK PIPELINES BASED ON NAMED TENSOR DIMENSIONS", by Yang et al (hereinafter, "Yang") describes such a DBSS. Descriptions of the examples of the disclosure frequently refer to a DBSS, such as described by Yang, as an example search space suitable for a CGRS compiler to determine mapping factors and mapping decisions. However, this is not intended to limit implementations. It will be appreciated by one of ordinary skill in the art that implementations of the disclosure can employ one or more search spaces alternative to, or comprising but not limited to, a DBSS. For example, in one alternative search space, operators and/or input/output tensors of operators can be indexed or named, and an index/name of an operator, operand, or result can be a query argument in API functions of the search space.

Components of a CGRS compiler, such as a mapper, can use query arguments in an API of the search space to determine operators and/or their input/output tensors, and/or attributes of operators and/or their input/output tensors in an application. In implementations, Named DIMs can represent dimensions of tensors on which successive operators can pipeline (parallelize) their computations, and Named DIMs can serve as query arguments of the DBSS API functions. In this way, a DBSS can operate as a lexicon (e.g. a lexicon comprising an inventory or record) of identities of operators, operands, and results in an application based on query arguments (e.g., an index, name, or Named DIM) of the search space API functions. To determine mapping decisions, a MAC can utilize a search space, such as a DBSS, to determine mapping decisions. A MAC, and/or components of a MAC, can utilize a search space to efficiently determine operators, their input/output tensors, and relationships between operators and input/output tensors.

FIG. 6 illustrates an example compiler comprising a MAC configured to create and/or utilize a search space, such as a DBSS. In FIG. 6, compiler 600 is shown receiving as inputs app 602, graph 604, and hardware specifications HW SPEC 606. Compiler 600 can be, for example, a CGRS compiler for compiling operations of an application to execute on a CGRS, and/or on CGR hardware of a CGRS. App 602 can comprise an application (e.g., as a graph) and/or other HLR) and compiler 600 can be a CGRS compiler, such as described in the examples of FIG. 3, that can compile app 602 for execution on a CGRS.

In implementations, app 602 can be any representation of a data-parallel or dataflow application, such as a neural network, natural language processing, image, video, and/or audio processing, for example. HW SPEC 606 can comprise a description of CGRS hardware to execute app 602 (e.g., to train and/or execute a machine learning function of app 602).

In implementations, graph 604 can be a computation graph or an auxiliary graph (an input graph, such as graph 604, modified to, for example, reflect mapping decisions of a CGRS compiler) corresponding to app 602. Compiler 600 can generate graph 604 based on app 602. Alternatively, compiler 600 can receive graph 604 as an input to compiler 600. While not shown in FIG. 6, compiler 600 can receive app 602 and/or graph 604 from a memory, a storage device, or a communications or API, for example.

Compiler 600 is shown in FIG. 6 comprising MAC 610, search 630, and mapper 620. In implementation MAC 610 can comprise, for example, a MAC layer, or function, of compiler 600, such as in the examples of MAC 416 in FIG. 4A. search 630 can be a search space, such as previously described. For purposes of illustrating the disclosure, search 630 can be considered to be a DBSS and can include Named Nodes corresponding to operators of app 602 as included in graph 604. FIG. 6 depicts search 630 comprising Named Nodes GeMM1 632, GeMM2 634, ADD1 636, and ADD2 638 (collectively, "Named Nodes 630"). Operator names of operators among Named Nodes 630 can correspond to types and/or instances operators of graph 604. In FIG. 6 GeMM1 632 and GeMM2 634 can correspond, for example, to two GeMM operators of graph 604. ADD1 636 and ADD2 638 can correspond, for example, to two ADD operators of graph 604.

Named Node GeMM1 632 is shown comprising respective input/output tensors OPND1, OPND2, and RESULTS, collectively, "tensors 632" for GeMM1 632; collectively, "tensors 634" for GeMM2 634; collectively, "tensors 636" for ADD1 636; and, collectively, "tensors 638" for ADD2 638. In Named nodes 630 descriptions of tensors 632, 634, 636, can comprise Named DIMs determined by MAC 610 based on dimensions of input/output tensors of the operators of graph 604. In the example of search 630, functions 640 of search 630 can comprise functions of an API of search 630 to enable mapper 620, and/or other functions of compiler 600, not shown in FIG. 6, to query search 630 using Named DIMs associated with the operators/results tensors of graph 604.

In implementations mapper 620 can comprise a component or function of compiler 600 to determine mapping decisions to map operations and data of app 602 to CGR hardware resources of a CGRS to execute app 602. Mapper 620 can comprise tiling functions, shown in FIG. 6 as tiling 620A, section cut functions, shown in FIG. 6 as sectioning 620B, and/or PAR factors/parallelization functions, shown in FIG. 6 as PAR 620C. Mapper 620 can, for example, query search space search 630 to perform functions among tiling 620A, sectioning 620B, and/or PAR 620C, and to determine mapping decisions.

Mapper 620 can query search 630 to determine options for tiling input/output tensors; to determine possible pipelines among operators of graph 604; to determine alternative section ("section cuts") based on the possible pipelines; and/or to determine PAR factors among operators of graph 604 based on pipelines, tiling, and/or section cut decisions. Mapper 620 can determine preferred mapping decisions, such as mapping decisions, and/or elected mappings (mapping decisions), based on optimization goals associated with executing app 602 on a CGRS. Compiler 600 (or, mapper 620) can utilize the mapping decisions to determine allocations of particular CGR hardware resources to operators/input/output tensors of graph 604, and/or to generate configuration files and/or execution instructions to execute app 602 on a particular CGRS.

Mapper 620 can generate an auxiliary graph, shown in FIG. 6 as aux graph 624, based on graph 604 with modifications to represent tiling, section cut, and/or parallelization decisions and/or decisions determined by mapper 620. Mapper 620 can utilize aux graph 624 to determine, for example, mapping decisions that optimize particular application execution parameters, such: as computational latency and/or throughputs, and/or utilization of particular CGRS hardware resources.

In traversing graph 604 (and/or aux graph 624), mapper 620 can determine possible pipelines that can be formed based on graph 604 and/or aux graph 624. Mapper 620 can include pipeline decisions, and/or particular execution parameters associated with the pipelines, among section cut alternatives. Pipelines determined by mapper 620 can comprise a set of operators, and/or pipeline and/or tiling decisions associated with operators within the scope of various pipelines. Mapper 620 can include pipeline determinations in search space search 630, and/or in elements (e.g., operator and/or input/output nodes) of graph 604 and/or aux graph 624.

In FIG. 6, based on mapping decisions determined by mapper 620, compiler 600 can generate an optional graph IR 608, which can be used to represent mapping decisions determined by mapper 620. Graph IR 608 can comprise an intermediate language (IL) representation of a mapping decisions, and/or partial mapping decisions (e.g., results of tiling, section, and/or parallelization decisions of mapper 620). Graph IR 608 can comprise IL constructs and/or statements, a schematic representation of operators and their associated input/output tensors, or a combination of these. Graph IR 608 can be machine readable, human readable, or a combination of machine and human readable constructs, language statements, and/or schematic representations.

In implementations mapper 620 can (optionally) record mapping decisions determined by analyzing graph 604 or aux graph 624, shown in FIG. 6 as mapping decisions 622 comprising (optional) tiling options 622A, (optional) section cuts 622B, and (optional) PAR factors 622C. Mapper 620 can record (e.g. include) mapping decisions in a search space, ss shown in FIG. 6 as components of search 630. Alternatively, or additionally, Mapper 620 can record (e.g. include) mapping decisions in aux graph 624, or other data structures. Mapper 620 can record mapping decisions 622 in a memory and/or a storage medium (e.g., for later retrieval in a subsequent compilation pass of compiler 600).

In implementations a MAC can perform multiple decision passes over a graph (or, elements of a graph), search space, and/or mapping decision space to determine mapping decisions. For example, a MAC can make a naming pass to determine names of operators and their input/output tensors in a graph to include in a search space (e.g., Named Nodes, Named DIMs, and DIM in a DBSS). A mapper of a MAC can make a tiling pass, to determine tiling decisions that can apply to the input/output tensors. In implementations, a MAC can perform a naming pass and a mapper of the MAC can determine, for example, alternative tiling decisions based on results of the naming pass. Alternatively, a mapper can perform a tiling pass and a MAC can determine operator and/or input/output names (e.g., Named Nodes and/or Named DIMs in a DBSS) based on tiling decisions resulting from the tiling pass.

A mapper can perform a section mapping pass to determine pipelines and groupings of operators into sections. The mapper can use results of a section mapping pass to make such determinations, such as naming/tiling decisions included in a mapping decisions space and/or search space. A mapper can perform a parallelization ("PAR") pass, based on results of the tiling and/or section mapping passes, to determine parallelization alternatives for executing operators of section cut alternatives on particular CGRS hardware.

Figure 7:
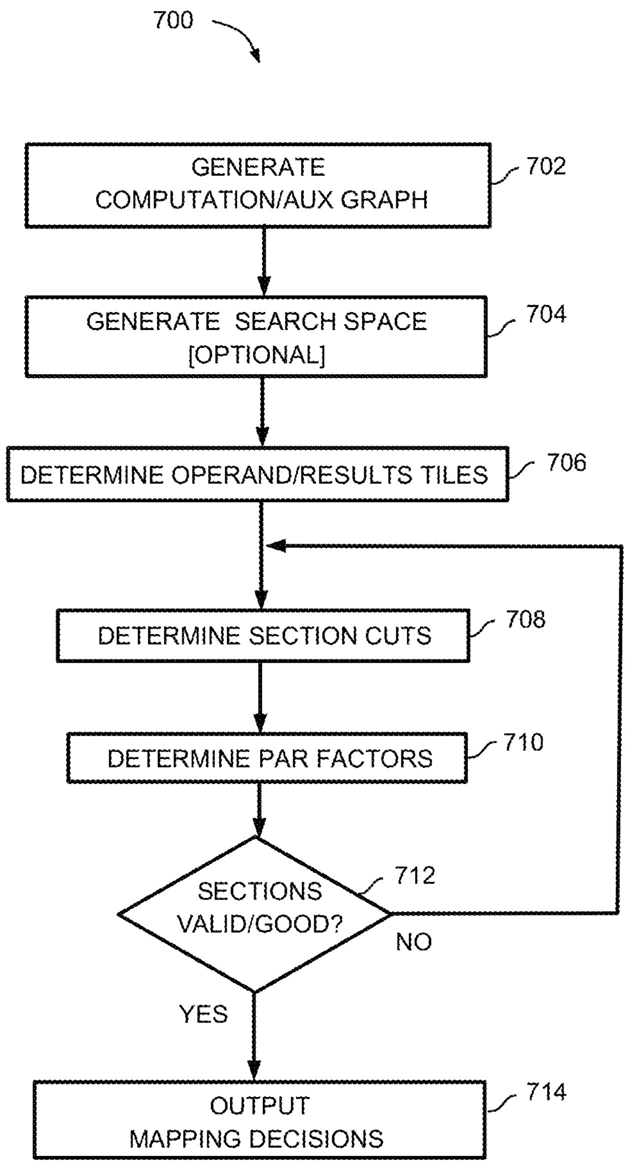
FIG. 7 illustrates an example method for performing multiple decision passes by a CGRS compiler, according to aspects of the disclosure.

FIG. 7 illustrates example method 700 for a mapper to perform multiple decision passes to determine mapping decisions. The method is described as performed by a MAC component of a CGRS compiler to determine mapping decisions such as previously described. However, this is only to illustrate the disclosure and not intended to limit implementations. It would be appreciated by one of ordinary skill in the art that a compiler need not necessarily comprise a MAC to perform the method or operations of the method. It would be further appreciated by one of ordinary skill in the art that a compiler can analyze a graph in manners alternative to, or inclusive of, the example of method 700, and that any particular component, or combination of components, of a compiler, or components of a computing system alternative to a compiler, can perform the method, and/or steps thereof.

In step 702 of method 700, the MAC generates (or, alternatively, receives) a graph (hereinafter, in reference to method 700, "the graph") corresponding to an application. The graph can comprise operators and input/output tensors of the operators, and their arrangement, dependencies, and data flow among the operators, such as previously described. The graph can comprise an initial graph of an application and/or an auxiliary graph generated by the compiler based on an initial graph of an application.

In step 704 the MAC can, optionally, generate a "search space" (hereinafter, for brevity, "the search space") that can include operators, input/output tensors of the operators, and/or attributes of operators and/or input/output tensors (e.g., dimensions, operator types, connection topologies, etc.). The MAC can perform steps among steps 706-710 to perform multiple decision passes associated with the graph. In each of steps 706-710, the MAC can traverse the graph and, optionally, query the search space, to determine attributes of the application operators, operands, and/or results to further determine mapping decisions. The MAC can traverse the graph in a variety of alternative traversal orders, such as depth-first or breadth first topological orders, or combinations of these. The MAC can traverse the graph recursively within a topological order.

In step 706 the MAC determines tiling decisions to slice input/output tensors of the application. In implementations a tiling decision can comprise a dimension on which to slice an output (results) tensor of one operator and input tensors of a successor operator to form a pipeline. As in the previous example of an M×K output tensor and a K×N input tensor, tiling the tensors on dimension K can be a component of a tiling decision to form a pipeline.

Additionally, a tiling decision can comprise a size and/or number of slices of a results and/or operand tensor. Using the same example of M×K and K×N output/input tensors, a mapper can determine (for example reasons to be discussed further on) to slice the M×K results tensor into some number, adding to a total of M, of smaller tensors having column dimension K. Alternatively, or additionally, a mapper can determine to slice the K×N operand tensor into some number, adding to a total of N, of smaller tensors having row dimension K.

Referring again to the example pipelines of FIG. 5, tiling decisions can include tiling results tensors output from one operator (or, pipeline) and input tensors of another operator (or, other pipeline). A mapper can determine a tiling decision of a pipeline such the tiling decision includes tiling decisions for nested (inner or child) pipelines.

One way to refer to a tensor, and tiles of tensors in particular, is to refer to a "shape" of the tensor. The shape of a tensor can be defined as the number of elements in each dimension of the tensor, sometimes represented as a tuple representing each dimension. To illustrate further, the shape of an M×K tensor can be said to be "M,K", and the shape of a K×N tensor can be said to be "K,N". A tiling decision can comprise, for example, an identity of a dimension on which to pipeline output and input tensors, and one or more shapes of tensors for different tiling alternatives (e.g., tiling a M×K tensor into two M/2×K tensors).

In step 708 the MAC determines section groupings (section cuts) of the operators of the graph. The MAC can determine section cuts based on, for example, tiling decisions determined in step 706, and/or relationships among operators of the graph, such as data flow relationships, and/or types of operators among operators of the graph. In step 708 the MAC can query the DB search space to determine operators that can be combined into particular sections (section cuts) that group operators to form a pipeline and/or pipeline of pipelines.

In step 710 the MAC determines PAR factors associated with tiling alternative determined in step 706 and/or section cuts determined in step 708. The MAC can, in step 710, determine PAR factors based on, for example, performance characteristics of the decisions as executed by particular hardware components of a CGRS. In step 710 the MAC can determine the PAR factors based on a hardware description of CGRS hardware resources available to execute the application.

In step 710 a MAC can determine PAR factors based, for example, on results of step 706 and/or step 708. PAR factors can include metrics such as a number of operands that can be processed in parallel within a pipeline, or pipelines; parallel or concurrent utilization of memories to execute particular operators and store their respective input/output tensors; staging of input/output tensors among various memories (e.g., "stage buffers") for execution by different operators; and/or, a number of particular compute units that can execute the model in parallel. In step 710, the MAC can query the search space to determine of different operators corresponding to section and/or tiling decisions.

In step 712, the MAC can determine if mapping decisions determined in steps 706-710 are valid and/or good. A mapping alternative can be a "valid" alternative if, for example, that alternative can "fit" in available CGRP hardware (e.g., input/output tensors of operators can be stored in one or more particular memories). A mapping alternative can be "good" if that alternative can achieve one or more mapping optimization goals, such as minimizing usage of particular CGRS memories (e.g., memories of CGRPs), or types of CGRP memories, minimizing a number of memory transfers and/or transfer latencies, minimizing computational latencies of an operator and/or pipeline of operators, and/or maximizing utilization of processors and/or memories of CGRP hardware.

If, in step 712, the MAC determines that mapping decisions resulting from one or more of steps 706-710 are not valid, not good, or a combination thereof, the MAC can repeat steps among steps 706-710 to determine additional or replacement mapping decisions. Alternatively, if the MAC determines, in step 712, that mapping decisions determined in one or more of steps 706-710 are valid, good, or a combination thereof, in step 714 the MAC outputs mapping decisions (e.g., CGR hardware resource allocations, input/output tensor tiling decisions, PAR factors from among the mapping decisions determined in steps 706-710.

In step 714 the MAC can elect particular mapping decisions and output these as mapping decisions for execution of the model on CGR hardware. Alternatively, or additionally, the MAC can output all, or a subset, of mapping decisions as potential mapping decisions, and another component of the compiler, or of an CGRS for executing the application, can elect particular mapping decisions as mapping decisions to configure CGR hardware and execute the application. In step 714 the MAC can output the mapping decisions to a mapping decision space (e.g., a data structure comprising mapping decisions), and/or to a search space. In step 714 the MAC can output the mapping decisions, for example to include in an IR of mapping decisions to execute the application, and/or an aux graph of the application.

While method 700 is described as performed by a MAC, in implementations a mapper of a MAC can analyze a graph, generate a search space (or, elements of a search space), perform a tiling pass, perform a sectioning pass, and/or perform a PAR pass. Thus, in the ensuing discussion of tiling, sectioning, and PAR passes of a compiler, without intending to limit implementations, the disclosure frequently utilizes the example of a mapper performing these passes.

A CGRS compiler can determine and/or elect mapping decisions (e.g., tiling, section cuts, and PAR factors) of a graph (operators and/or tensors) that can optimize CGR hardware allocation and/or application execution to achieve particular optimization objectives. Optimization objectives can include, for example, memory optimization objectives and/or processing optimization objectives. In implementations, a memory optimization objective can include, for example, fitting (storing) all elements of operand and/or results tensors in a pipeline within particular memories, such as memories of a CGRP or other memories used to process the input/output tensors; minimizing or, alternatively, maximizing memory utilization, such as usage of a total number, or type, of memories to process input/output tensors; minimizing numbers of memory-memory transfers, and/or latencies associated with such transfers; and/or minimizing a number of stage buffers to process input/output tensors in a pipeline.

Processing optimization objectives can include, for example, maximizing the number of stages and/or operators in a pipeline; maximizing the number of parallel operations (e.g., computations and/or data transfers) and/or operators (e.g., a number of CGRPs executing in parallel) in a graph; maximizing utilization of certain, or all, CGRPs (e.g., processors executing an operator), and/or components of CGRPs; minimizing computational latencies for some, or all, of the operators in a graph; and/or balancing pipeline stages (e.g., tiling input/output tensors and mapping operators in a pipeline such that all stages of the pipeline execute with no, or minimal, interstage delays).

Optimization objectives can include user-defined objectives (e.g., memory and/or processing objectives determined by a programmer of a user application), and/or system-defined objectives. User-defined and/or system-defined objectives can be based on CGRS and/or CGR hardware design. User-defined and/or system-defined objectives can be included, for example, in application programming statements and/or constructs (e.g., data structures), and/or compiler input files.

As used herein, the term “optimization objective”, used alone, refers interchangeably to memory optimization objectives, processing optimization objectives, and a combination of memory and processing optimization objectives. Similarly, as used herein, the term “optimization metric”, used alone, refers to refers interchangeably to memory optimization metrics, processing optimization metrics, and a combination of memory and processing optimization metrics.

In implementations, optimization objectives can correspond to, and/or be based upon, particular optimization metrics. Optimization metrics can include, for example, a data transfer latency, a computational latency, a total execution latency, a computational throughput, a number of parallel computations and/or data transfers, a memory utilization, and/or a processor (e.g., CGRP) utilization.

CGR hardware can comprise, or otherwise have access to, a variety of “on-chip” and/or “off-chip” memories. On-chip memories (e.g., in the examples of Grohoski and Kumar, PMUs, SRAMs, scratch pad, stage buffers, and/or caches) can be integrated in a CGRP, and/or an IC, to be closely coupled to one or more CGRPs. Off-chip memories can be memories (e.g., DRAM memories) of, or accessible to, CGRPs that are implemented on an IC different from that of a processor, or compute unit of a CGRP executing an operator. Off-chip memories can be larger (have greater data capacity) than on-chip memories, but can be accessible to CGRPs at generally lower bandwidths or clock frequencies in comparison to on-chip memories.

Thus, while on-chip memories can have very high bandwidths in comparison to off-chip memories, they can be correspondingly limited in size (data capacity) in comparison to off-chip memories. CGR hardware can comprise a mix of on-chip and off-chip memories, such that a particular allocation of these memories to operators in a pipeline, and/or CGRPs processing input/output tensor data in particular memories, can dramatically affect throughput and/or computational latency of model execution on the CGR hardware. Memory optimization objectives can include, or be based upon, such aspects of CGR hardware.

Additionally, applications can comprise much more data than can be stored and/or operated upon in relatively much less numbers and sizes of CGR memories. To process application data, operand and results data must “fit” in one or more CGR memories in order for a CGRP to operate on that data. In some cases a mapper can slice a results and/or operand so that the tensors can better fit in CGR memories, and/or can achieve efficient operator pipelines, to execute the application. Thus, it can be necessary for a mapper to slice application data and/or input/output tensors into smaller “tiles” for processing as input/output tensors of operators of the application. As used herein, the term “hardware tile” refers to a tile such as described in Grohoski and Kumar, comprising compute (PCU) and/or memory (PMU) units. In contrast, the term “tile”, used herein as a noun, without the qualifier “hardware”, refers to a partition of a larger tensor, such as an M×K/2 tile formed by slicing an M×K tensor into two M×K/2 tiles.

For example, a tensor having dimensions [1024,1024] totals something more than one million tensor elements, and may not fit, in its entirety, within memories available to process the tensor. Consequentially, a mapper can determine to slice the tensor into a set of smaller tiles-such as 64 tensors of dimensions [128, 128], or 128 tensors of dimensions [8×8]—such that the smaller, tiled tensors can fit in CGR memories for processing by one or more CGRPs. The number of tiles that a mapper can form along a particular dimension of a tensor can be referred to as a "degree". Tiles of alternative degree can be based on multiplicative factors of the dimension sizes. For example, a mapper can slice a 128×128 tensor along its row dimension to form 128 tiles of shape [1,128] having degree "128"; 64 tiles of shape [2,64] having degree "64"; or, 32 tiles of shape [16,128] having degree "16". Alternatively, a mapper can slice the 128×128 tensor along its column dimension for form 128 tiles of shape [128,1], 64 tiles of shape [128,2], or 32 tiles of shape [128,16].

In a tiling pass, one objective of a mapper can be to determine dimensions and degrees on which to slice input/output tensors based on, for example, sizes and/or types of memories available in CGA hardware and/or tensors of operators that can form a pipeline. As used herein, the term "tiling" refers to determining shared dimensions on which operators of an application (e.g., operators included in a graph of the application) can form a pipeline, and determining degrees on which to slice input/output tensors to form tiles based on the shared dimensions. "Tiling decisions", as used herein, correspondingly refers to a particular shape and/or degree that a mapper can apply to slice input/output tensors, such as to fit (or, fit more efficiently) into CGR memories.

In implementations a mapper can determine tiling decisions, for example, to balance pipeline stages, such that the stages can operate synchronously, without inter-stage delays based on input/output tensor sizes, to form a more efficient (and, lower execution latency) pipeline. A mapper can determine tiling decisions based on, in another example, whether or not output tensor data must be buffered in stage buffers, and/or remote memories, between pipeline stages, and the type/sizes of CGR memories to operate as stage buffers.

Applications, and corresponding graphs, can comprise multiple different pipeline possibilities, including nested pipelines, involving particular operators of a graph. The pipeline possibilities can be determined by, and differ as to operators that can pipeline computations concurrently, based upon tiling decisions applied to input/output tensors of operators in a graph. Tiling decisions can affect CGRS execution of an application according to how each tiling decision can allocate CGR memories to store or buffer tensor data, facilitate pipelining operators, and/or produce more or less balanced pipelines. Thus, in sectioning and PAR passes a mapper can determine more optimal section cut and/or parallelization decisions based on tiling decisions that correspond to optimization objectives to execute an application. As results tensors must sometimes be materialized in a stage buffers between processors implementing operators of a graph, a mapper can determine tiling decisions based upon attributes of particular memories, or a number of memories, utilized as stage buffers to store the input/output tensor data. A mapper can evaluate alternative tiling decisions based on optimization metrics related to memories and/or stage buffers utilized for processors to access tensor data.

However, as a graph can comprise tens of thousands of operators, a mapper can determine potentially many alternative tiling decisions associated with each operator, and operands and/or results tensors associated with each operator, in a graph. Evaluating all, or even most, possible tiling decisions in a graph can impose substantial computational time and/or resources during compiler execution. Therefore, it is advantageous, if not essential, for a mapper to efficiently determine, or identify, tiling decisions that can promise the most optimal section cut and/or parallelization decisions, and omit those that are of lesser, or minimal, value in view of particular memory and/or processing optimization objectives.

As used herein, the term "optimization objective", used alone, refers interchangeably to memory optimization objectives, processing optimization objectives, and a combination of memory and processing optimization objectives. Similarly, as used herein, the term "optimization metric", used alone, refers to refers interchangeably to memory optimization metrics, processing optimization metrics, and a combination of memory and processing optimization metrics.

In implementations, a mapper can apply a "tiling cost" (TC) model to evaluate tiling decisions and identify more or less promising decisions among a larger set, and to reduce the number of tiling decisions (and/or corresponding sectioning or parallelizing decisions) a mapper may need to analyze. A TC model can evaluate a tiling decision based on memory optimization metrics associated with that tiling decision, such as a utilization of a memory, or memories; latency of memory accesses; sizes and/or types of memories; memory-to-memory transfers and/or transfer latencies; a number and/or size of stage buffers required, or even whether or not a particular tiling alternative can require buffering between pipeline stages.

A TC model can evaluate a tiling decision based on processing optimization metrics associated with, or based on, that tiling decision, such as a number of processors utilized in a pipeline; a utilization of a processor in a pipeline; a hardware length of a pipeline (e.g., a number of CGRPs and/or memories forming an execution pipeline); a number of operators in a graph that can form a pipeline; and/or transfers of tensor data in and/or out of memories based on that tiling decision.

A mapper can apply a TC model to tiling decisions associated with each operator of a graph and, based on comparative tiling costs output by the model, can select a subset of tiling options (and/or limit generating particular decisions) on which to base further mapping decisions, such as section cut and/or parallelization decisions. A mapper can apply a TC model to determine costs of tiling decisions associated with alternative input/output tensor dimensions on which a pipeline can be formed and/or to determine cost metrics (e.g., memory or latency costs) of operators within the scope of a pipeline. Cost metrics to evaluate operators of a pipeline, and/or the pipeline as a whole, can correspond to optimization metrics associated with particular optimization objectives. A mapper can apply a TC model to potentially eliminate tiling decisions that do not improve one or more of the optimization metrics. Based on such an evaluation a mapper can reduce, or limit, the number of mapping decisions associated with each operator in a graph.

Figure 8A:
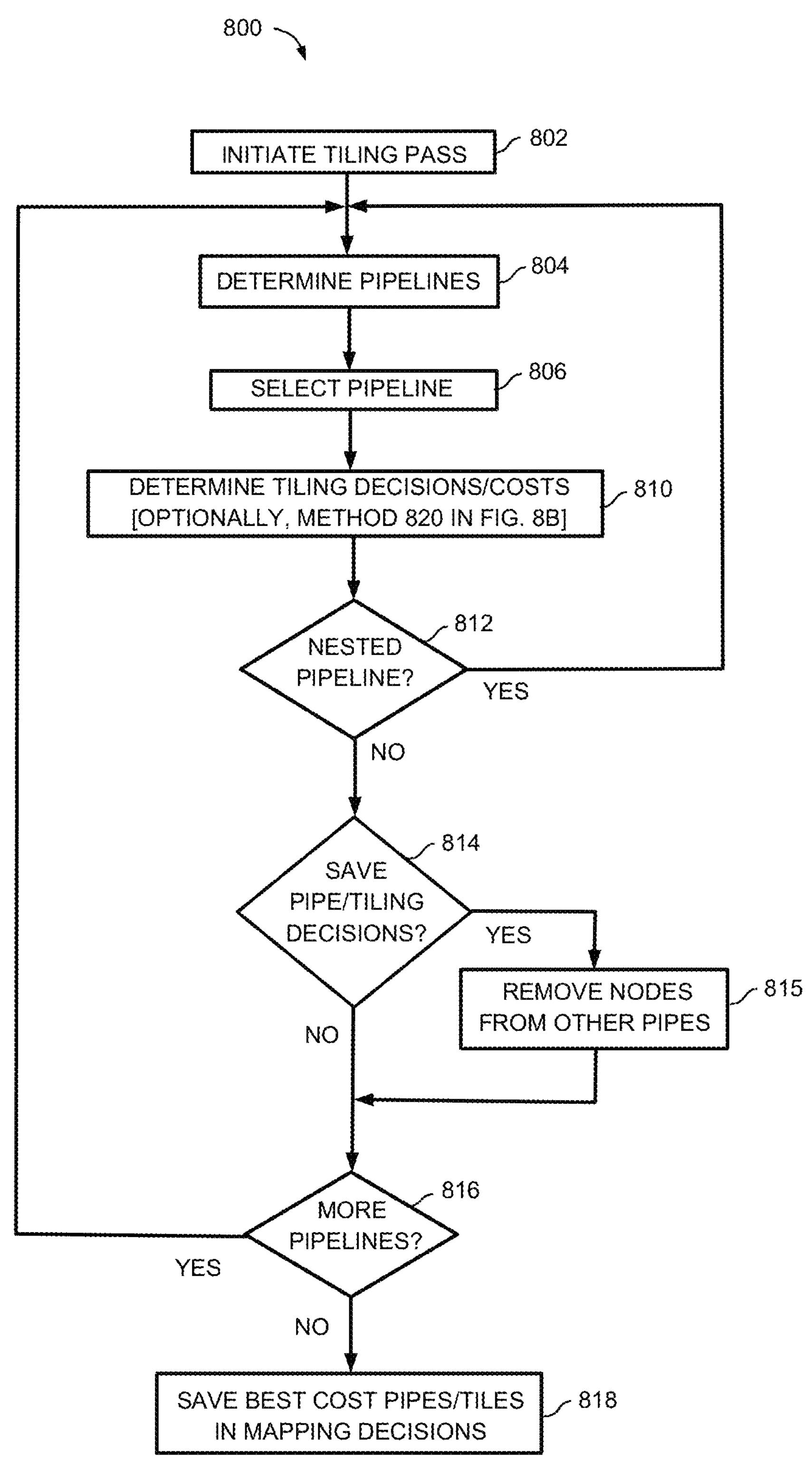
FIG. 8A illustrates an example method for determining pipelines by a CGRS compiler, according to aspects of the disclosure.

FIG. 8A illustrates example method 800, which a mapper can perform to determine and evaluate and identify optimal tiling decisions and, optionally, eliminate sub-optimal tiling decisions. As will be seen in the example of method 820 in FIG. 8B, a mapper can apply a TC model to determine optimal and/or sub-optimal tiling decisions. In subsequent mapping passes, such as sectioning and/or parallelization, a mapper can determine more optimal mapping decisions based on results of applying a TC model to tiling decisions.

For purposes of illustrating the method, but not intended to limit implementations, method 800 is described as performed by a mapper function (or, component) of a compiler ("the mapper" and "the compiler", respectively, with reference to method 800) as applied to a computation graph of an application ("the graph" with reference to method 800) comprising operators, operands tensors, and results tensors of the application.

Turning now to FIG. 8A, in step 802 of method 800 the mapper initiates a tiling pass over a graph to identify operators of a graph having shared dimensions among their respective output and input tensors, for determining possible pipelines and associated tiling decisions. The graph can comprise an input graph or, alternatively, an auxiliary graph based on an input graph, and the operators can be sorted topologically, for example, in the graph. Components of the graph (e.g., nodes, input and output tensors of nodes, and edges connecting nodes) can be represented textually, graphically, and/or an IR of the graph. In step 802 the mapper can initiate a tiling pass over an entire graph of an application or, alternatively, over a subset of a graph.

To determine tiling decisions, the mapper can determine possible pipelines among operators that can be formed based on shared dimensions of output and input tensors of operators of the operators and can further determine alternative tile shapes/degrees of the output/input tensors of the operators. In step 804, the mapper traverses the graph determine possible pipelines, in which each pipeline is based on pipelining operators along a particular dimension of output and input tensors. With reference again to FIG. 5, given a graph such as graph 500 and operator types for operators N1-N5, and shared possible dimensions of output/input tensors of the operators (not shown in FIG. 5), the mapper can determine, in step 804, pipelines 502, 504, and/or 506 of graph 500.

In step 804 the mapper can, for example, query a DB search space based on input/output tensor Named DIMs to determine operators that can form a pipeline on a particular dimension, such as to determine the example pipelines illustrated in FIG. 5. Optionally, the mapper can determine pipelines based, at least in part, on a memory containing an output and/or input tensor of an operator, such as an on-chip or off-chip memory.

In step 806, the mapper selects a candidate pipeline from among the pipelines determined in step 804 and in step 810 the mapper determines possible tiling decisions that can apply to the candidate pipeline. The mapper can apply optimization objectives to determine, in step 810, alternative tiling decisions and can apply a TC model to the tiling alternatives to evaluate those alternatives in comparison to the tiling objective. In method 800, in step 810 the mapper can perform a tiling method, illustrated by example method 820 of FIG. 8B, to determine and evaluate possible tiling of output/input tensors among operators in the pipeline selected in step 806. As seen in the example of method 820, a tiling method can save one or more optimal tiling decisions (e.g., particular tensor tile shapes) based on the associated tiling costs of alternative tiling decisions.

In step 812, based on the tiling decisions determined in step 810 for the candidate pipeline selected in step 806, the mapper determines if it can create one or more nested pipelines within the candidate pipeline. If so, the mapper repeats steps 804 through 812 among the operators within the candidate pipeline. In this way, the mapper can recursively create nested pipelines. Using FIG. 5 as an example, in step 804 the mapper can initially create pipeline 502 and perform steps 806-810. In step 812, the mapper can determine that it can create pipeline 504 (along a different dimension than pipeline 502) and can repeat steps 804 to 810 with pipeline 504. In performing step 812 with pipeline 504, the mapper can determine that it can create pipeline 506 and can again repeat steps 804 to 810 with pipeline 506. It is worth noting that a pipeline can comprise only a single, individual operator, and in step 812 can input the individual operator to method 820 to determine tiling decisions associated with that individual operator and evaluate the tiling decisions using a TC model.

In step 814, the mapper determines, based on the tiling decision and costs determined in step 810, whether or not to save the pipeline and tiling decision among mapping decisions to execute the graph on CGR hardware. If so, in step 815, the mapper removes the nodes of the pipeline evaluated in step 810 from consideration among alternative pipelines.

In step 816 the mapper determines if there are more pipelines to evaluate using the TC model. If so, as some nodes can be removed in step 815 and some candidate pipelines have become invalid, the mapper repeats steps 804-816 to reevaluate pipeline candidate pipelines with the remaining nodes. For example, in step 816 the mapper can determine that there may be more pipelines to evaluate based on some nodes of the graph not already included in a pipeline, such that there may be possible pipelines that can be formed with those nodes. In step 816 the mapper can determine that there are not more pipelines to evaluate based on all nodes being either included in a pipeline or being nodes that cannot form a pipeline (e.g., based on the mathematical functions computed by a particular node and those of its predecessor and successor nodes of the graph).

If, in step 816, the mapper determines that there are no additional pipelines to evaluate, in step 818 the mapper ends the tiling pass and includes, among mapping decision to execute the graph, pipelines and associated tiling decisions that, based on the TC model (e.g., are saved or otherwise output by method 820 in FIG. 8B), improve the mapping decisions in comparison to the optimization objective.

In implementations, to "improve" an optimization objective means that a mapping decision meets or exceeds a metric associated with an optimization objective. For example, a tiling decision that reduces memory utilization (of a particular memory, or a set, of memories, for example) improves an optimization objective based on minimizing memory utilization. Similarly, a tiling decision that increases processor utilization (of a particular processor, or a set, of processors, for example), or parallelization of operators (e.g., increases a PAR factor), improves an optimization objective based, respectively, on maximizing processor utilization or operator parallelization. In another example, a tiling decision that meets or exceeds a metric associated with an optimization objective, such as a total memory utilization metric (where meeting or exceeding the metric means producing a memory utilization no greater than the memory utilization metric), improves the optimization objective.

In step 818 the mapper ends the tiling pass. In ending the tiling pass, in step 818, the mapper can save results of the tiling pass in mapping decisions to execute the graph. The mapper can, use the pipeline/tiling decisions, for example, to determine and/or evaluate, and/or elect, other mapping decisions, such as section cuts and/or PAR factors. The mapper can save candidate pipelines determined and/or evaluated in method 800, dimensions/degrees of various tiling decisions, a set of tiling decisions that lie within a range of optimization metrics that can satisfy optimization objectives included in TC model, and/or any information that can assist in subsequent sectioning and/or parallelization mapping decisions. In step 818, the mapper can record results of a tiling pass with operator information included in a search space, in elements of a graph or IR of a graph, and/or separately form a search space or a graph.

Figure 8B:
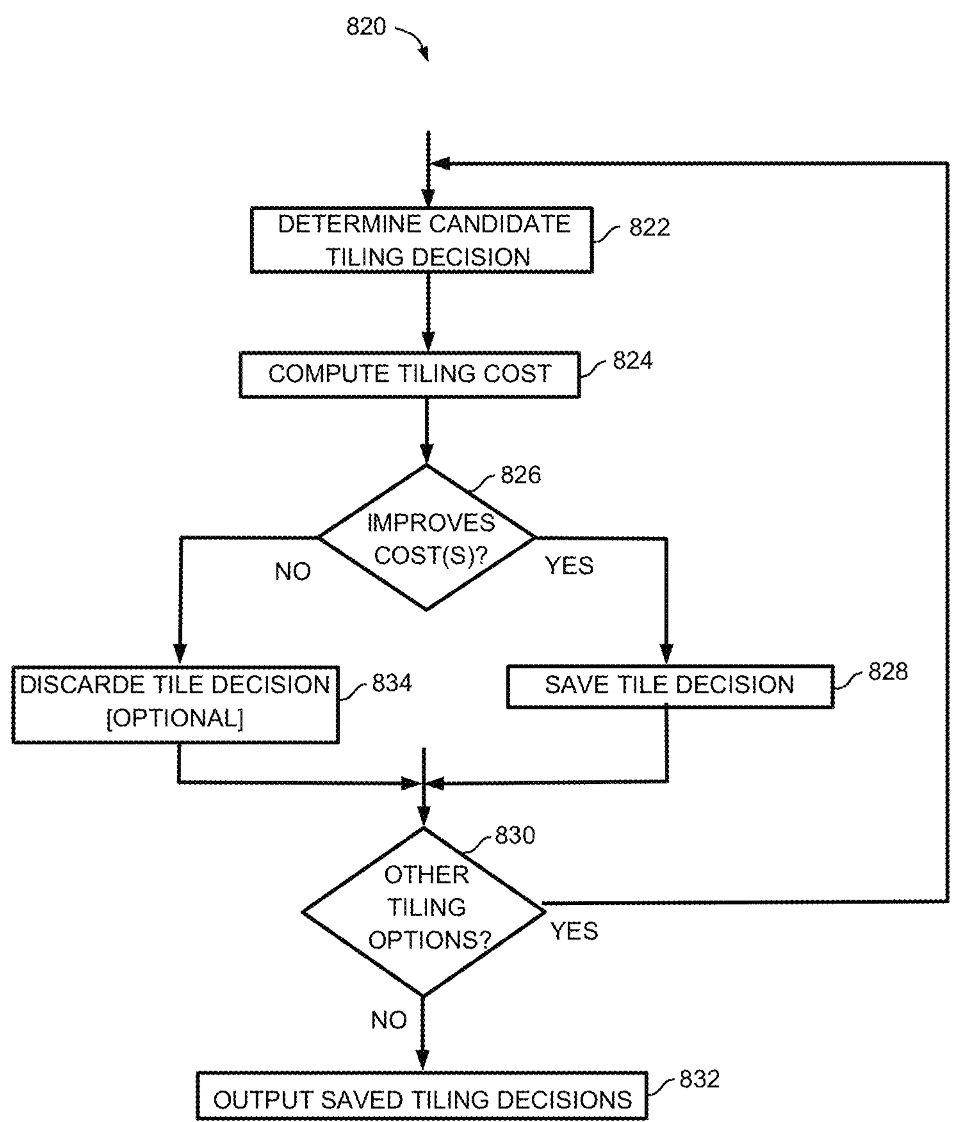
FIG. 8B illustrates an example method for determining tiling decisions by a CGRS compiler, according to aspects of the disclosure.

FIG. 8B illustrates an example method to determine alternative tiling decisions applicable to a pipeline, such as a pipeline selected in step 806 of method 800. For purposes of illustrating the method, but not intended to limit embodiments, method 820 is described as performed by the mapper of example of FIG. 8A, in step 810 of method 800 of FIG. 8A. The mapper can perform operations of methods 800 and 820, to determine, using a TC model, tiling decisions within a pipeline that can improve section cut and/or parallelization decisions of a graph.

In step 822 of method 820, the mapper determines a candidate tiling decision for an input pipeline (e.g., a pipeline of step 810 of method 800 in FIG. 8A) comprising a dimension and degree on which to slice output and input tensors of operators of the input pipeline.

In step 824 the mapper applies a TC model to the candidate tiling decision determined in step 822 to compute a tiling cost of the candidate decision. For example, in step 824 the TC model can compute a tiling cost of the candidate decision based on optimization metrics, such as previously described, associated with the candidate decision. In method 820, a consumer operator of a pipeline can comprise an operator alone, or can comprise another pipeline nested within the pipeline associated with the candidate tiling decision. Thus, in step 824, computing a tiling cost can include computing, or utilizing, a tiling cost computed for a pipeline comprising a nested pipeline.

In step 826 the mapper determines if the candidate tiling cost determined in step 824 improves or, alternatively, at least does not worsen, an optimization metric, such as an optimization metric used to compute the tiling cost. For example, the mapper can, in step 826, compare the tiling cost of the candidate decision to a threshold value of an optimization metric. A lower tiling cost (e.g., at or below a threshold value of an optimization metric) can correspond to a tiling decision that improves a mapping decision in comparison to an optimization objective. For example, a lower tiling cost can correspond to a tiling decision that utilizes a particular memory, as an alternative to other memories; a tiling decision that utilizes smaller, and/or fewer, stage buffers; and/or, a tiling decision that produces better processor to memory ratios. In another example, a lower tiling cost can correspond to a tiling decision that minimizes (saves) memory utilization overall.

Alternatively, a higher tiling cost (e.g., above a threshold value of an optimization metric) can correspond to a tiling decision that worsens a mapping decision in comparison to an optimization objective. For example, a higher tiling cost can correspond to a tiling decision that utilizes a particular memory, as an alternative to other memories; that utilizes larger, or more, stage buffers; and/or, that produces poorer processor to memory ratios. In another example, a higher tiling cost can correspond to a tiling decision that increases memory utilization overall, or that increases processor throughput or utilization.

In some cases, a lower tiling cost can correspond to a tiling decision that worsens a mapping decision, such as a tiling cost that corresponds to a tiling decision that decreases utilization of a particular memory, or that decreases processor throughput or utilization above a threshold value of throughput or utilization. Similarly, in some cases, a higher tiling cost can correspond to a tiling decision that improves a mapping decision. For example, in some cases a higher tiling cost can correspond to a tiling decision that increases utilization of a particular memory; increases processor throughput or utilization above a threshold value of throughput or utilization; increases a number of parallel computations (e.g., a number of CGRPs executing in parallel within a pipeline), and/or increases a number of operators within a pipeline scope.

Improving an optimization metric, in step 826, can correspond to a tiling cost lying within a tolerance, or range, of an optimization metric. Improving an optimization metric can be comparative with respect to tiling costs determined for alternative tiling decisions. If a tiling cost of the candidate tiling decision improves an optimization more so than that of an alternative tiling decision, the mapper can determine that the candidate tiling decision improves the optimization metric.

If the mapper determines in step 826 that the candidate tiling decision improves or, optionally, does not worsen the optimization metric, in step 828 the mapper saves the candidate tiling decision for output to a function of the mapper that initiated method 820. For example, in step 828 the mapper can save the candidate tiling decision in a search space, in a mapping decision space, in an auxiliary graph or IR of a graph, or any combination of these. If the candidate tiling decision improves an optimization metric in comparison to an alternative tiling decision, in step 828 including the candidate tiling decision in the mapping decisions can include, for example, the mapper replacing an alternative tiling decision among the mapping decisions. If the mapper determines in step 826, alternatively, that the tiling decision does not improve or, worsens, the optimization metric, the mapper can, optionally, in step 834 discard the candidate tiling decision (e.g., exclude it from the set of tiling decisions saved in step 828).

In step 830 the mapper can determine if there is an alternative, or additional, tiling decision that can be applied to the pipeline and evaluated based on the TC model, such as tiling the output/input tensors along a different dimension and/or different degree. If the mapper determines that there is an alternative, or additional, tiling decision that can be evaluated, the mapper repeats steps 824 to 830. If the mapper determines, alternatively, in step 830 that that there are no alternative, or additional, tiling decisions that can be evaluated, in step 832 the mapper ends determining tiling decisions for the pipeline input to the method (e.g., from step 810 of method 800). In ending the tiling decisions for the input pipeline, the mapper can output the tiling decisions saved in step 828, such as for input to step 818 of method 800 and/or for use in other mapping passes of the mapper, such as section cut and/or PAR factor passes.

Figure 9A:
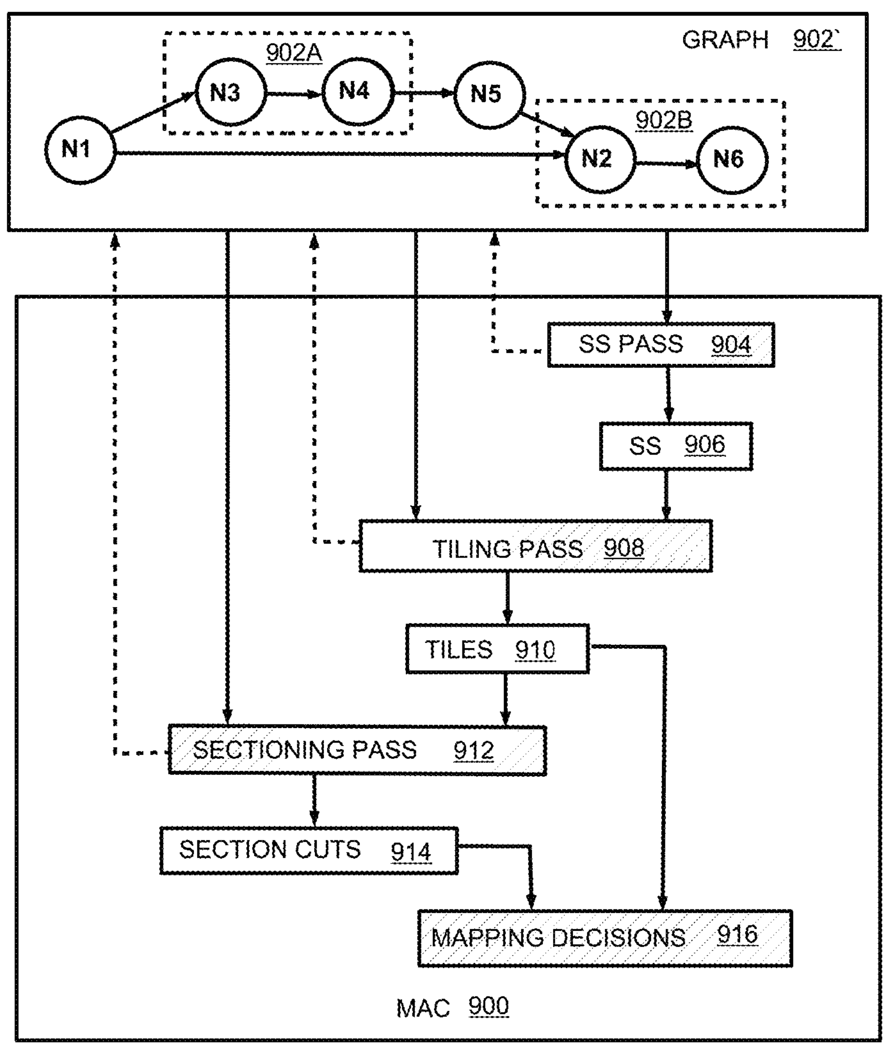
FIG. 9A illustrates another example of compiler passes to determine section cuts of a graph, according to aspects of the disclosure.

FIG. 9A illustrates another example of multiple decision passes of a compiler to determine mapping decisions, such as tiling, section cut, and PAR decisions. In FIG. 9A, example MAC 900 is shown comprising SS pass 904, SS 906, tiling pass 908, tiles 910, sectioning pass 912, section cuts 914, and mapping decisions 916. MAC 900 can comprise, for example, a component of a CGRS compiler and can determine mapping decisions to map an application, represented by graph 902, for execution by a CGRS. Alternatively, a compiler including MAC 900 can perform some or all of the mapping operations illustrated in the example of FIG. 9A. In implementations, graph 902 can be an application (and/or auxiliary) graph, and is shown comprising operator nodes N1-N6 (hereinafter, "nodes 902"). Mapping decisions 916 can include tilling, section cut, and/or PAR decisions determined by MAC 900 based on graph 902.

SS pass 904 can comprise analyzing graph 902 to determine a search space that can enable more efficient determination of mapping decisions among enormously large numbers and complex topologies of (operator and/or data) nodes of a graph. SS pass 904 can comprise, for example, operations to generate a search space such as in the example of step 704 of method 700 in FIG. 7. As a result of SS pass 904, MAC 900 can generate search space SS 906; SS 906 can comprise, for example, a DBSS.

Tiling pass 908 can comprise analyzing graph 902 to determine alternative tiling decisions among nodes 902. As previously described, operators in a graph can form a pipeline based on a shared dimension of operator output and input tensors. One way to refer to a tensor, and tiles of tensors in particular, is to refer to a "shape" of the tensor. The shape of a tensor can refer to the number of elements in each dimension of the tensor, sometimes represented as a tuple representing each dimension. For example, the shape of an M×K tensor can be said to be "M,K", and the shape of a K×N tensor can be said to be "K,N".

A mapper can determine to slice (partition) output/input tensors of operator nodes into a set of smaller tiles. Slicing a tensor into smaller tiles can, for example, be necessary to "fit" elements of a tensor in CGR hardware (e.g., a memory or stage buffer of a CGRP) to process the elements. For example, a mapper can slice a tensor of dimension [128×128] into 64 tiles (tensors) of dimension [2×128]. As used herein, the term "hardware tile" refers to a tile such as described in Grohoski and Kumar, comprising compute (PCU) and/or memory (PMU) units. In contrast, the term "tile", used herein as a noun, without the qualifier "hardware", refers to a partition of a larger tensor, such as an M×K/2 tile formed by slicing an M×K tensor into two M×K/2 tiles. The number of tiles that a mapper can form along a particular dimension of a tensor can be referred to as a "degree". In the example just described, the degree of slicing the [128×128] into 64 smaller tiles can be said then to be degree 64.

In a tiling pass, such as tiling pass 908, a mapper can determine dimensions, degrees, and/or shapes of input/output tensors for dataflow through operators of a graph (and/or a section of a graph). A tiling decision of a mapper can, therefore, include some or all of a dimension on which to form a pipeline among operators of the graph; a degree on which to slice one or more output/input tensors; and, shapes of output/input tiles corresponding to the degree of slicing the output/input tensors.

As used herein, the term "tiling" refers to determining shared dimensions on which operators of an application (e.g., operators included in a graph of the application) can form a pipeline, and determining degrees on which to slice input/output tensors to form tiles based on the shared dimensions. "Tiling decisions", as used herein, correspondingly refers to a particular degree and/or shape that a mapper can apply to slice input/output tensors, such as to fit (or, fit more efficiently) into CGR memories.

Tiling pass 908 can determine tiling decisions among nodes 902 based on dimensions and tiling of input/output tensors of nodes among nodes 902. Tiling pass 908 can output tiling decisions as tiles 910, and can include tiles 910 in mapping decisions 916. Additionally, or alternatively, Tiling pass 908 can modify graph 902 to include tiling decisions regarding nodes 902.

Sectioning pass 912 can comprise analyzing graph 902 to determine section cut decisions among operator nodes of graph 902. Sectioning pass 912 can determine section cut decisions based, for example, on tiling decisions among tiles 910 and/or PAR factors associated with operators and/or operator topologies of the section cuts. For example, graph 902 is shown having section 902A, comprising nodes N3 and N4, and section 902B, comprising nodes N2 and N6 (nodes N1 an N5 can be, implicitly section cuts including only themselves, in addition or alternative to other section cuts not shown in FIG. 9A). MAC 900 can determine section 902A to comprise nodes N3 and N4, and section 902B to comprise nodes N2 and N6, based on tiling decisions associated with the nodes included in each of the sections, and/or PAR factor associated with a pipeline formed among operators in sections 902A and 902B, for example. Sectioning pass 912 can output section cut decisions as section cuts 914, and MAC 900 can include section cut decisions among section cuts 914 in mapping decisions 916. Additionally, or alternatively, Sectioning pass 912 can modify graph 902 to include section cut decisions of graph 902.

In implementations, a compiler, or a MAC of a compiler, can include a mapper (not shown in FIG. 9A), such as illustrated by mapper 620 in FIG. 6, to determine tiling and/or section cuts of a graph. In FIG. 9A, tiling pass 908 and/or sectioning pass 912 can be functions of a mapper (not shown in FIG. 9A) of MAC 900. Thus, further examples of mapping (tiling, section cut, and PAR) functions of a compiler uses the example of a mapper of a compiler to perform mapping functions and operations such as determining tiling, section cut, and PAR decisions. However, this is for purposes of illustrating the disclosure and not intended to limit implementations. It would be appreciated by one of ordinary skill in the art that such functions/operations can be embodied in any of a variety of compiler components/functions, and/or programs not necessarily included in a compiler.

Turning now to determining section cuts in a graph, a mapper can determine candidate nodes to include in sections of the graph for mapping to CGR hardware. Candidate nodes to include in a section cut can depend on, for example, the type and/or computational demands of operator of each node; the ability to pipeline some or all of the operators withing a section; tiling decisions and/or PAR factors; and/or CGR hardware design. Candidate nodes of a section can be nodes of a pipeline, and/or can be nodes of differing pipelines, can comprise nested pipelines, and/or in can be included in differing paths through the graph, provided the candidate nodes meet section validity constraints. Section validity constraints can include that a section (e.g., operators and/or data included in a section) can, in combination, fit in CGR hardware and either are successor operators in a graph or can be performed without violating dependency relationships among operators (e.g., with reference to FIG. 9A, node N4 cannot be included in a section that includes N2 but not N3, as N2 is a consumer node of N3).

A section cut decision can comprise a set of operators (nodes) of graph and, optionally, an arrangement of the operators (e.g., within pipelines, and/or in parallel with other operators) to execute data flow of the application. Operators can be included in a section based on the section validity constraints just described. Section cut decisions can, additionally, include values of optimization metrics corresponding to the operators and/or their arrangement within the section cut decision. A mapper can partition a graph into many differing, alternative section cuts, in which particular operators can be included in one section cut versus another. Particular section cut decisions can produce better or worse model execution results, compared to other decisions, based on optimization metrics corresponding to optimization objectives, such as described in the previous examples of determining tiling decisions.

For example, one particular section cut decision can have better (e.g., lesser) pipeline latencies as compared to other section cut decision, or can have lesser memory usage as compared to other section cut decisions. Some section cuts can have a higher degree of parallelization (e.g., can comprise more pipeline stages and/or more concurrently executing processors) compared to others. PAR factors associated with each section alternative can determine, or indicate, whether or not a degree of parallelization of one section alternative can improve (e.g., with respect to optimization objectives) model execution as compared to degrees of parallelization of other, alternative section cuts.

As in the case of tiling decisions, in implementations a mapper can determine and/or evaluate section cut decisions based on, and/or incorporate, particular optimization objectives and/or optimization metrics. Exhaustively evaluating all possible section cut decisions against particular optimization objectives can produce highly accurate (e.g., highly accurate optimization metrics) and optimal mappings. As with tiling alternatives, however, as a given graph can comprise tens of thousands of nodes, exhaustively evaluating every possible section cut alternative can demand substantial computational resources and/or can require substantial execution time. Thus, it is desirable to determine section cuts, in mapping application models, in a manner that can balance computational demands/execution time of a compiler and resulting accuracy of computed optimization metrics and/or the number of section cut alternatives evaluated.

To more efficiently evaluate alternative section cut decisions, in implementations a mapper can apply a "balanced cost (BC)" model to determine section cuts of a graph that can achieve optimization goals based on mapping decisions corresponding the section cuts (.e.g., operators included in a section and/or tiling decisions associated with the operators). A BC model can comprise a coarse-cost (CC) model component and a fine-cost (FC) model component, each of which can be used to evaluate a section cut comprising a set of candidate nodes of a graph. As a result of applying a BC model to a graph (e.g., to candidate nodes of a section cut of a graph), a mapper can determine attributes (e.g., performance and/or utilization attributes) of differing section cut decisions and/or determine particular section cut decisions (e.g., operators included in section cuts) that can optimize model execution against particular optimization objectives.

In implementations, a CC model can evaluate a section cut (e.g., nodes included in a section cut) based on metrics such as a ratio of off-chip memory usage and/or transfers to total operations performed in the section cut (e.g., total number of operators, total computational operations per second of the combined operators, etc.). A CC model can evaluate a section cut on a variety of execution metrics of nodes included in the section and/or attributes or characteristics of corresponding CGRA hardware, and can comprise metrics that are readily computed (e.g., require relatively minimal computational resources and/or time) but that may sacrifice accuracy of optimization metrics.

A CC model can be a faster but less accurate model by which to evaluate mapping decisions, such as alternative section cut decisions, while a FC model can demand greater execution resources and/or time, but can have results with greater accuracy and/or improved model execution optimization, as compared to coarse-cost models. Thus, by applying a BC model to evaluate section cut decisions, a mapper can determine section cut decisions of a graph, in mapping decisions, that can balance execution resources/time and accuracy/optimization of mapping decisions.

Figure 9B:
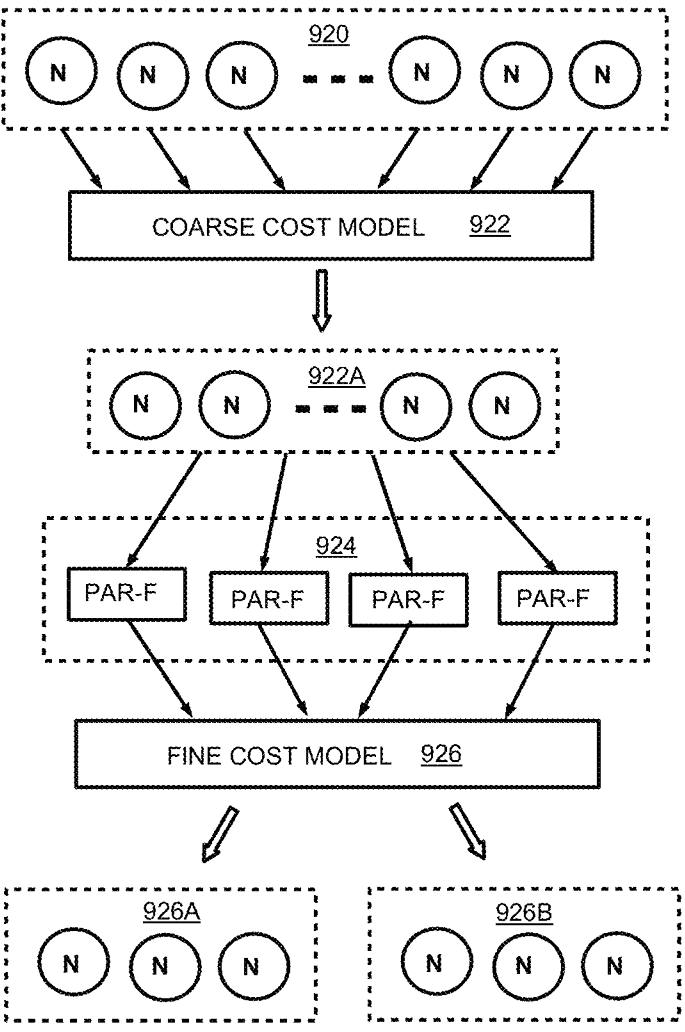
FIG. 9B illustrates an example of cost models to evaluate section cut decisions of a graph, according to aspects of the disclosure.

FIG. 9B illustrates an example flow of sectioning a graph utilizing a BC model. FIG. 9B depicts an example section cut of candidate operator nodes ("N"), shown as node set 920, that can comprise nodes of an application/auxiliary graph for cost evaluation. A mapper can select nodes of the graph as candidates, such as node set 920, to include in one or more section cuts (or, section cut decisions) of the graph to evaluate the section for a relative computational cost.

As previously described, a mapper can apply a cost model, such as a BC model, to determine and/or elect section cut decisions. In FIG. 9B, a BC model can comprise coarse cost model 922 and fine cost model 926. A mapper can apply coarse cost model 922 to node set 920 to determine a coarse candidate set of nodes of node set 920, shown as node set 922A in FIG. 9B, to include in one or more section cut decisions. A coarse candidate set of nodes can be a subset of a set of candidate nodes, such as node set 920.

The mapper can determine PAR factors 924 (e.g., PAR factors that can minimize execution and/or memory latencies) corresponding to nodes of node set 922A, and/or can apply fine cost model 926 to node set 922A, to determine nodes to include in one or more "fine candidate" sets" of nodes among node set 920. For example, in FIG. 9B, node set 926A and node set 926B can be fine candidate sets of nodes determined by applying fine cost model 926 to node set 922A in light of PAR factors 924. Fine cost model 926 can use PAR factors, such as PAR factors 924, to determine nodes among nodes among node set 922A for inclusion in a fine candidate set of nodes, such as node set 926A and/or node set 926B.

The mapper can select nodes among the node set 926A and/or 926B to determine and/or elect section cut decisions comprising nodes among node set 922. Additionally, or alternatively, the mapper can repeat applying the BC model (coarse cost model 922 and fine cost model 926) using fine candidate node sets 926A and/or 926B as a candidate node set of node set 920.

Figure 10:
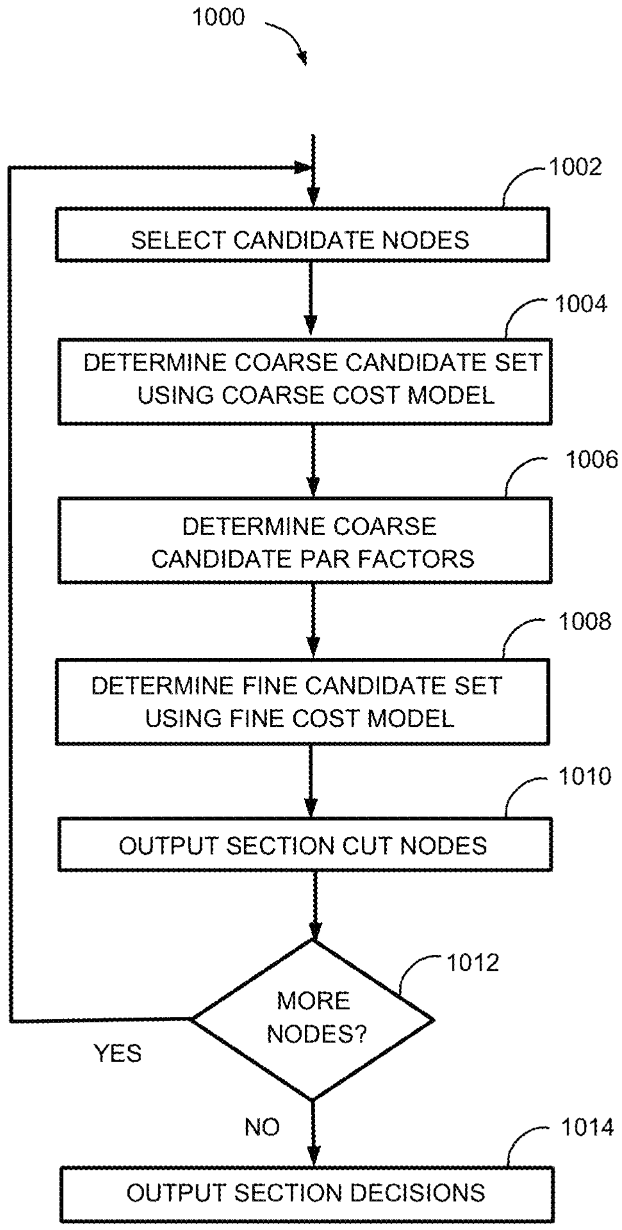
FIG. 10 illustrates an example method for evaluating section cut decisions by a CGRS compiler, according to aspects of the disclosure.

FIG. 10 illustrates example method 1000 for a mapper to apply a BC model to a graph to determine alternative section cut decisions and/or elect particular section cut decisions from among the decisions. A mapper can modify a graph (e.g., generate or modify an auxiliary graph) based on results of applying BC model to section cut decisions, and a compiler (or, a mapper of a compiler) can generate a graph IR with mapping decisions based on such a modified graph. For purposes only of illustrating the method, but not intended to limit implementations, method 1000 is described as performed by a mapper and as applied to a graph comprising operator nodes. A mapper can perform method 1000 as part of traversing a graph to determine mapping decisions.

Turning now to FIG. 10, in step 1002 of method 1000 the mapper selects a set of candidate nodes of a graph. In step 1002, the mapper can select candidate nodes based on a particular step, or topological location, of a graph traversal. As previously described, the mapper can select candidate nodes based on the nodes, and/or their input/output tensor data, able to fit, in combination, within limits of available CGRA hardware. A mapper can select candidate nodes based on the ability for form one or more pipelines of the nodes, and/or their relative locations within the graph topology (or, a subset of the graph topology).

In step 1004, the mapper applies a coarse-candidate (CC) model component of a BC model to the candidate nodes. The CC model can evaluate a cost of executing the operators in the graph, on particular CGRA hardware, that requires less computation of execution and/or optimization metrics, for each operator, and/or the operators in combination, but can yield execution and/or optimization metrics of less accuracy than other computations that can be highly accurate.

As a result of applying the CC model, in step 1004 the mapper can determine a "CC set" of operators, among the candidate operators selected in step 1002, that can, individually and/or in combination, yield an execution metric of the CC model (e.g., an off-chip memory to total operations ratio) that satisfies an optimization criterion. Operators can be included in a CC set based, for example, on the operators individually and/or in combination yielding an execution metric of the CC model that lies below a threshold value of the execution metric.

Using the CC set results of applying a CC model, in step 1004, to the initial candidate section operands (selected in step 1002), a mapper can then apply an FC model to further evaluate and/or elect section cut decisions. PAR factors of operators of a section cut, and/or a combination of operators of section cut, can correlate to more or less optimal execution metrics of a CC set (e.g., of the operators of the CC set individually and/or in combination). For example, particular PAR factors can correlate to computational throughput of executing operators in the CC set on CGRA hardware. Thus, in step 1000, for each operator in the mapper determines PAR factors associated with operators included in the CC set.

In step 1008, the mapper applies an FC model to the operators included in the CC set to determine a "fine candidate (FC)" set of operators. The FC model can, for example, compute highly accurate latency metrics for executing the operators of the CC set on CGRA hardware, either individual operator latencies and/or execution latencies of the combined operators. Execution latencies can comprise, for example, individual processor latencies, memory access and/or transfer latencies, of a combination thereof.

An FC model, in step 1008, can compute, for example, a ratio of computed CC set execution throughput to ideal (or, theoretical maximum) throughput of the CGRA hardware. Computing throughputs can require further computing stage latencies of pipelines of operators within the CC set, as executed on CGRA hardware. Improving pipeline latencies and/or throughput can require computing alternative processor/memory allocations to determine allocations that can achieve maximum throughputs, and/or minimum latencies. In making various such computations, an FC model can yield highly accurate computational, and/or mapping metric, results but can do so at a cost of greater computational resources and/or execution time.

Based on application, in step 1008, of the FC model to the CC set, in step 1010 the mapper can determine an FC set of operators to include in an optimal section cut, and can output the optimal section cut for evaluation and/or inclusion in subsequent mapping decisions and/or elections. In step 1010 the mapper can select operators to include in the FC set based on the operators, individually and/or in combination, optimizing a metric computed in the FC model, and/or optimizing a metric derived from or otherwise related to a metric computed in the FC model. Metrics computed in the FC model can be among a larger set of optimization metrics on which a mapper can base selection of operators to include in the FC set.

In step 1010 the mapper outputs the FC set as a potentially optimal section cut alternative of the graph. The mapper can output the FC set by including optimization metrics computed by the CC and/or FC models as attributes of operators in an auxiliary graph, in a search space, and/or in a set of mapping decisions and/or elections. The mapper can output the FC set as a section cut alternative among a set of section cuts of the graph, and the set of section cuts of the graph can be inputs to final mapping decisions/elections of the mapper applied to the input application model.

In step 1012 the mapper determines whether or not to evaluate more section cut decisions of the graph. In step 1012, the mapper can determine whether or not to evaluate more sections based, for example, on having completed or, not completed, traversing the graph. Completing a graph traversal can comprise having traversed all nodes, or having traversed a selected subset of nodes. For example, in a particular graph, a mapper can seek to optimize mapping for only certain nodes, or groups of nodes, within the graph and elect to not determine particularly optimized mappings of other nodes. In step 1010, the mapper can remove nodes included in the FC set as candidates in the graph for other section cut decisions and, in step 1012, the mapper can determine that there are more section cut decisions to evaluate based on the remaining nodes of the graph not yet included in a section cut. In step 1012 the mapper can repeat steps 1002-1012 using the FC set of nodes.

If, in step 1012, the mapper determines that there are more section cut decisions to evaluate, the mapper can repeat steps 1002-1012 with a subsequent set of candidate nodes. In repeating steps 1002-1002, the mapper can include operators included in the CC and/or FC sets as candidates in other, alternative section cut decisions, or can omit operators included in the CC and/or FC sets as candidates in other, alternative section cut decisions.

In implementations, in steps 1004, 1006, 1008, and/or 1012, the mapper can apply a variety of search algorithm to select candidates sets. A search algorithm can comprise, for example, a binary search of nodes of the graph, and/or a beam search of the graph. Search algorithms can be, or can be included in, computation modules, such as programs and/or hardware (e.g., accelerator processors for search a graph) modules. Thus, in implementations a mapper (or, a compiler) can combine different search algorithms/modules in applying a BC model, a CC model, and/or an FC model, or similar such cost models.

If, in step 1012, the mapper determines there are no more section cut decisions to evaluate, in step 1014 the mapper ends section cut evaluation and/or selection. In ending section cut evaluation/selection, the mapper can output a set of section cut decisions such as to a set of mapping decisions. The mapper, and/or other components of the compiler, can use the output section cut decisions to determine mapping decisions to execute the graph, such as mapping decisions that can be included in an IR description of the graph and hardware mappings.

Figure 11:
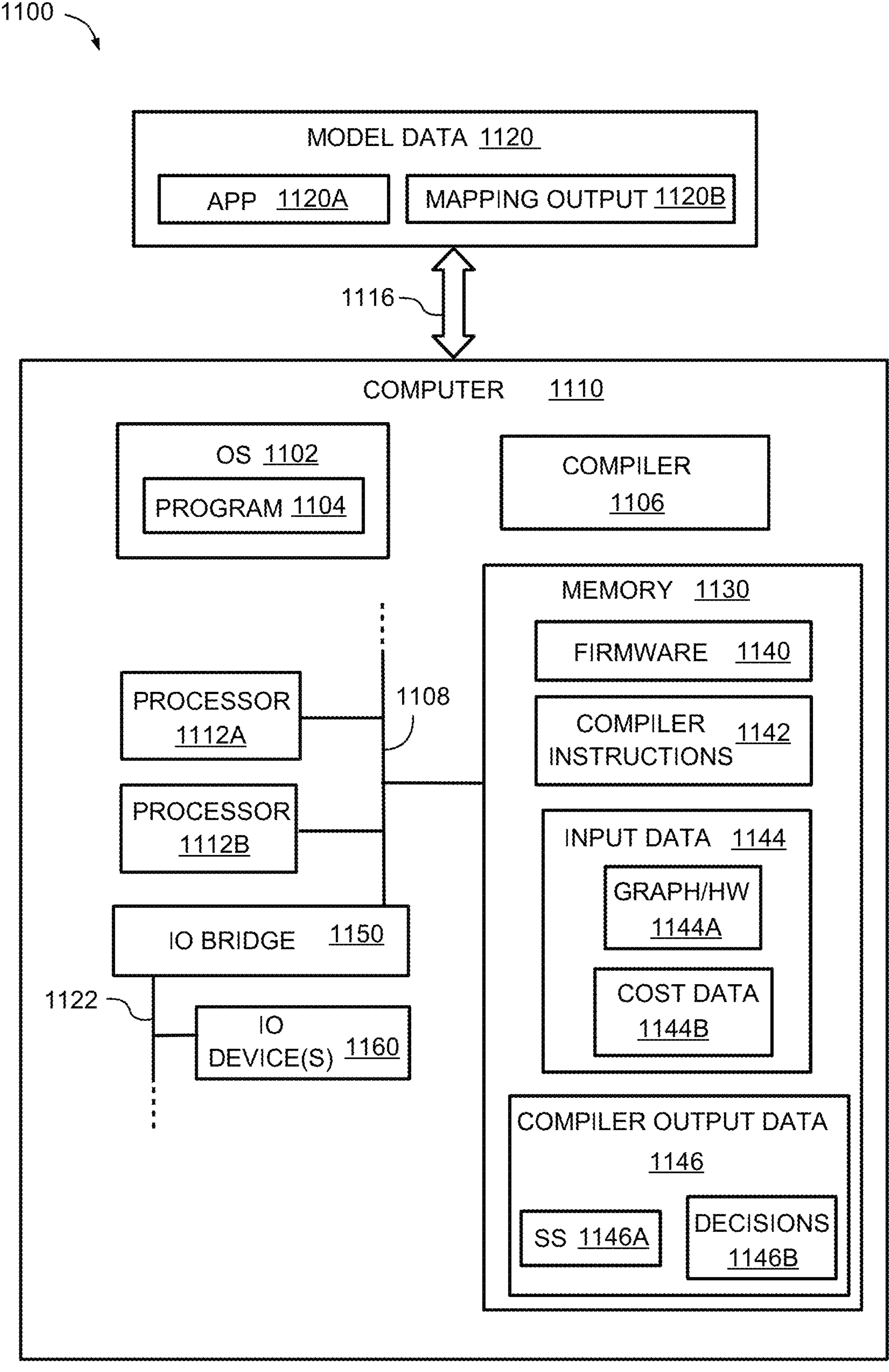
FIG. 11 illustrates an example system comprising a Model Analyzer and Compiler, according to aspects of the disclosure.

FIG. 11 illustrates another example computing system for implementing features and aspects of the disclosure. In FIG. 11, computing system 1100 comprises computer 1110 communicatively coupled to model data 1120 via interface 1116. Computer 1110 is shown comprising compiler 1106, which can be a CGRS compiler similar or equivalent to compiler 600 of FIG. 6, for example.

In implementations compiler 1106 can receive an application model and/or graph of an application, shown as app 1120A in FIG. 11, from model data 1120 and can output to mapping output 1120B results of mapping decisions of compiler 1106, such as mapping decisions determined using a method, or operations of a method, such as in the example of method 700 in FIG. 7. APP 1120A can comprise input data to compiler 1106 such as, for example, a description of hardware resources of a CGRS (not shown in FIG. 11), and/or an application model and/or graph of an application model. Mapping output 1120B can comprise outputs of compiler 1106, such as mapping decisions of compiler 1106, CGRS hardware allocations to operators and/or input/output tensors of an application represented by app 1120A, and so forth. Compiler 1106 can output modifications, based on mapping decisions, to a graph of app 1120A, an IR of app 1120A, and/or an auxiliary graph of app 1120A.

Computer 1110 is shown further comprising OS 1102, program 1104 shown as included in memory 1130, firmware 1140. OS 1102 can, for example, host execution of programs such as program 1104. OS 1102, program 1104, and/or programs of firmware 1140 can comprise standalone programs, such as OS kernel programs, firmware, a hypervisor, or any variety of program utilized by a computer to manage execution of the computer. Compiler 1106 can comprise one or more programs and OS 1102 can, for example, comprise an operating system to host execution of programs of compiler 1106.

Hardware components of computer 1110 are shown comprising processors 1112A and 1112B (collectively, "processors 1112), memory 1130, interconnect fabric 1108, IO Bridge 1150, IO Device(s) 1160, and IO interconnect 1122. Processors among processors 1112 can comprise any number, type, and/or combinations of hardware processor, cores of a hardware processor, and/or thread of a hardware processor. Computer 1110 can comprise a host computer of a CGRS and processors among processors 1112 can comprise a host processor and/or a runtime processor. Processors among processors 1112A and 1112B can execute programs of computer 1110, such as OS 1102, program 1104, program of firmware 1140, and/or programs of compiler 1106.

As illustrated in FIG. 11, interconnect fabric 1108 can comprise one or more hardware interconnections to interconnect processors 1112, memory 1130, and/or IO bridge 1150 in any combination. In implementations, interconnect fabric 1108 can comprise, for example, one or more memory buses, processor nests, and/or switching fabrics, in any combination or arrangement.

Processors 1112A and/or 1112B can communicate, via IO Bridge 1150, with IO device(s) 1160 which can comprise one or more IO devices. IO devices can comprise network interface cards, storage media and/or adapters, display adapters, keyboard/mouse adapters, and so forth among peripheral devices of a computer or computing system.

Memory 1130 can comprise one or more memories of computer 1110, such as main memories, cache memories, flash memories, in any combination or arrangement. Memory 1130 can store, for example, instructions, input operands, and/or output results of programs executing in computer 1110. As shown in FIG. 11, memory 1130 can store compiler instructions 1142 for compiler 1106 to traverse a graph, generate a DBSS, and/or determine mapping decisions.

Memory 1130 can store input data 1144 as inputs to compiler 1106, such as graph/HW input data 1144A and TC model data 1144B. Graph/HW input data 1144A can comprise, for example, graph data of app 1120A and/or a hardware specification data corresponding to CGRS hardware. TC model data 1144B can comprise, for example, optimization objectives and/or metrics to use in determining mapping decisions.

Memory 1130 can store, in compiler output data 1146, results of traversing and/or analyzing a graph, such as data to include in a search space and mapping decisions. As shown in FIG. 11, compiler output data 1146 include search space SS 1146A, which can be a DBSS such as in the examples of the disclosure. Decisions 1146B can comprise mapping decisions determined by a mapper of compiler 1106. For example, decisions 1146B can comprise tiling decisions output from a tiling pass of compiler 1106, and/or section cut decisions and/or PAR factors/decisions output from a sectioning pass of compiler 1106.

Implementations can comprise a computer program product and can include a computer readable storage medium (or media) having computer readable program instructions of the computer program product incorporated therein. It will be understood by one of ordinary skill in the art that computer readable program instructions can implement each or any combination of operations and/or structure of the disclosure, such as illustrated by the drawings and described herein.

The computer readable program instructions can be provided to one or more processors, and/or other elements, of a computing system or apparatus to produce a machine which can execute, via the processor(s), to implement operations and/or actions similar or equivalent to those of the disclosure. The computer readable program instructions can be stored in a computer readable storage medium that can direct one or more processors, and/or other elements, of a computing system or apparatus to function in a particular manner, such that the computer readable storage medium comprises an article of manufacture including instructions to implement operations and/or structures similar or equivalent to those of the disclosure.

The computer readable program instructions of the computer program product can cause one or more processors to perform operations of the disclosure. A sequence of program instructions, and/or an assembly of one or more interrelated programming modules, of the computer program product can direct one or more one or more processors and/or computing elements of a computing system to implement the elements and/or operations of the disclosure including, but not limited to, the structures and operations illustrated and/or described in the present disclosure.

A computer readable storage medium can comprise any tangible (e.g., hardware) device, or combination of tangible devices, that can store instructions of the computer program product and that can be read by a computing element to download the instructions for use by a processor. A computer readable storage medium can comprise, but is not limited to, electronic, magnetic, optical, electromagnetic, and/or semiconductor storage devices, or any combination of these. A computer readable storage medium can comprise a portable storage medium, such as a magnetic disk/diskette, optical disk (CD or DVD); a volatile and/or non-volatile memory; a memory stick, a mechanically encoded device, and any combination of these. A computer readable storage medium, as used herein, is not to be construed as being transitory signals per se, such as electrical signals transmitted through a wire, radio waves or other freely propagating electromagnetic waves, or electromagnetic waves propagating through a wave transmission medium (e.g., a wave guide or fiber-optic cable).

The computer readable program instructions can be communicated from the computer readable storage medium to the one or more computing/processing devices, via a programming API of a computing system, and/or a communications interface of a computing system, having access to the computer readable storage medium, and/or a programming API of a computing system, and/or a communications interface of the one or more computing/processing devices. The API(s) and/or communications interface(s) can couple communicatively and/or operatively to a network, such as the Internet, a local area network, a wide area network, and/or a wireless network. The API(s) and/or communications interface(s) can receive the computer readable program instructions read from computer readable storage medium and can forward the computer readable program instructions to the one or more computing/processing devices via the API(s), communications interface(s), and/or network.

In implementations, the computer readable program instructions of the computer program product can comprise machine language and/or assembly language instructions, instruction-set-architecture (ISA) instructions, microcode and/or firmware instructions, state-setting data, configuration data for integrated circuitry, source code, and/or object code. The instructions and/or data can be written in any combination of one or more programming languages.

The computer readable program instructions can execute entirely, or in part, on a user's computer, as a stand-alone software package; partly on a user's computer and partly on a remote computer; or, entirely on a remote computer. A remote computer can be connected to a user's computer through any type of network, including a local area network (LAN) or a wide area network (WAN). In implementations, electronic circuitry including, for example, FPGA, PLAs, and or CGRPs can execute the computer readable program instructions by utilizing state information of the computer readable program instructions to configure the electronic circuitry to perform operations or elements of the disclosure, such as illustrated by the drawings and described herein.

In implementations, computer readable program instructions can also be loaded onto a computing system, or component(s) thereof, to cause the computing system and/or component(s) thereof to perform a series of operational steps to produce a computer implemented process, such that the instructions which execute on the computing system, or component(s) thereof, implement the operations or elements of the disclosure, such as illustrated by the drawings and described herein.

The flowchart and block diagrams in the Drawings and Incorporations illustrate the architecture, functionality, and operation of possible implementations of systems, methods, and computer program products according to various implementations of the present invention. Individual elements illustrated in the Figures—such as individual operations illustrated in the flowcharts or individual blocks of block diagrams—can represent a module, segment, or portion of executable instructions for implementing the disclosed function(s). In various alternative implementations, particular operations can occur in an order differing from that illustrated in the examples of the drawings. For example, two operations shown in succession in a diagram of the disclosure may, in a particular implementation, be executed substantially concurrently, or can sometimes be executed in a reverse order, depending upon the functionality involved. It will be further noted that particular blocks of the block diagrams, operations of the flowchart illustrations, and/or combinations of blocks in the block diagrams and/or flowchart illustrations, can be implemented using special purpose hardware and/or systems that, individually or in combination, perform the specified functions, acts, and/or computer instructions.

Terminology used herein, and the examples disclosed, are chosen to illustrate the principles of the implementations, the practical application or technical improvement over alternative technologies, and to enable others of ordinary skill in the art to understand the implementations disclosed herein. The disclosure illustrates various example implementations, and the examples are intended to illustrate principles and aspects of the disclosure, but are not intended to limit implementations, nor intended to be exhaustive of implementations that can be conceived within the scope of the disclosure. It would be apparent to one of ordinary skill in the art that alternative implementations can comprise modifications and combinations within the spirit of the disclosure and the scope of the claims.

As can be seen in the foregoing examples, features of the disclosure can comprise methods and apparati of computing systems. A summary of example implementations of such features includes:

Example Implementation 1

A method comprises determining, by a compiler of a first computing system, based on a first shared dimension of output and input tensors of a first set of operators, a first pipeline comprising the first set of operators, the first set of operators among operators included in a graph, the operators included in the graph comprising operators of a dataflow application; determining, by the compiler, a first tiling decision associated with the first pipeline; determining, by the compiler, a first tiling cost associated with the first tiling decision, the first tiling cost corresponding to a first optimization objective; determining, by the compiler, based on the first tiling cost, that the first tiling decision improves the first optimization objective; and, including, by the compiler, based on the determining that the first tiling decision improves the first optimization objective, the first pipeline and the first tiling decision among mapping decisions associated with executing the dataflow application by a second computing system.

Example Implementation 2

The example of implementation 1, wherein the first pipeline comprises a nested pipeline.

Example Implementation 3

The example of implementation 1, wherein the method further comprises determining, by the compiler, a second tiling decision associated with an operator among the operators included in the graph; determining, by the compiler, a second tiling cost associated with the second tiling decision, the second tiling cost corresponding to a second optimization objective; determining, by the compiler, based on the second tiling cost, that the second tiling decision improves the second optimization objective; and, including, by the compiler, based on the determining that the second tiling decision improves the second optimization objective, the operator and the second tiling decision among mapping decisions associated with executing the dataflow application by the second computing system.

Example Implementation 4

The example of implementation claim 1, the method further comprising determining, by the compiler, based on a second shared dimension of output and input tensors of a second set of operators among the operators included in the graph, a second pipeline comprising the second set of operators; determining, by the compiler, a second tiling decision associated with the second pipeline; determining, by the compiler, a second tiling cost corresponding to the second tiling decision, the second tiling cost based on a second optimization objective; determining, by the compiler, based on the second tiling cost, that the second tiling decision does not improve a second optimization; and, excluding, by the compiler, based on the determining that the second tiling decision does not improve the second optimization objective, the second pipeline from among the mapping decisions associated with executing the dataflow application by the second computing system.

Example Implementation 5

The example of implementation 1, wherein the first tiling decision comprises a first tile shape to slice an output tensor of a first operator, included in the first pipeline, the output tensor comprising an input tensor to a second operator included in the first pipeline.

Example Implementation 6

The example of implementation 1, wherein the method of the compiler determining the first tiling cost comprises determining, by the compiler, the first tiling cost using a tiling cost model to compute the first tiling cost.

Example Implementation 7

The example of implementation 1, wherein the method of determining, by the compiler, based on the first tiling cost, that the first tiling decision improves the first optimization objective comprises comparing, by the compiler, the first tiling cost to a threshold value of an optimization metric associated with the first optimization objective.

Example Implementation 8

The example of implementation 1, wherein the first optimization objective comprises a memory optimization objective selected from a group consisting of: a first tile shape fitting in a first memory of the second computing system; increasing a utilization of a second memory of the second computing system; reducing a number of stage buffers among a first producer operator and a first consumer operator included in the first pipeline; and, reducing a size of a stage buffer among a second producer operator and a second consumer operator.

Example Implementation 9

The example of implementation 1, wherein the first optimization objective comprises a processing optimization objective selected from a group consisting of: increasing a number of operators comprising the first pipeline; increasing a number of parallel operations performed by the second computing system to execute the dataflow application; increasing a utilization of a first processor of the second computing system to execute the dataflow application; and, balancing pipeline stages in the first pipeline.

Example Implementation 10

A computer program product comprises a computer readable storage medium having first program instructions embodied therewith, wherein the first program instructions are executable by at least one processor to cause the at least one processor to: determine, based on a first shared dimension of output and input tensors of a first set of operators, a first pipeline comprising the first set of operators, the first set of operators among operators included in a graph, the operators included in the graph comprising operators of a dataflow application; determine a first tiling decision associated with the first pipeline; determine, a first tiling cost associated with the first tiling decision, the first tiling cost corresponding to a first optimization objective; determine, based on the first tiling cost, that the first tiling decision improves the first optimization objective; and, include, based on the determining that the first tiling decision improves the first optimization objective, the first pipeline and the first tiling decision among mapping decisions associated with executing the dataflow application by a second computing system.

Example Implementation 11

The example of implementation 10, wherein the first program instructions are executable by the at least one processor to further cause the at least one processor to: determine the first tiling cost using a tiling cost model to compute the first tiling cost.

Example Implementation 12

The example of implementation 10, wherein the first program instructions are executable by the at least one processor to further cause the at least one processor to: determine a second tiling decision associated with an operator among the operators included in the graph; determine a second tiling cost associated with the operator, the second tiling cost corresponding to a second optimization objective; determine, based on the second tiling cost, that the second tiling decision does not improve a second optimization objective; and, include, based on the determining that the second tiling decision improves the second optimization objective, the operator and the second tiling decision among mapping decisions associated with executing the dataflow application by the second computing system.

Example Implementation 13

A first computing system comprises a processor and a compiler configured to execute on the processor to determine, based on a first shared dimension of output and input tensors of a first set of operators, a first pipeline comprising the first set of operators, the first set of operators among operators included in a graph, the operators included in the graph comprising operators of a dataflow application; determine a first tiling decision associated with the first pipeline; determine a first tiling cost associated with the first tiling decision, the first tiling cost corresponding to a first optimization objective; determine, based on the first tiling cost, that the first tiling decision improves the first optimization objective; and, include, based on the determining that the first tiling decision improves the first optimization objective, the first pipeline and the first tiling decision among mapping decisions associated with executing the dataflow application by a second computing system.

Example Implementation 14

The example of implementation 13, wherein the first pipeline comprises a nested pipeline.

Example Implementation 15

The example of implementation 13, wherein the compiler is further configured to execute on the processor to determine a second tiling decision associated with an operator among the operators included in the graph; determine a second tiling cost associated with the second tiling decision, the second tiling cost corresponding to a second optimization objective; determine, based on the second tiling cost, that the second tiling decision improves the second optimization objective; and, include, based on the determining that the second tiling decision improves the second optimization objective, the operator and the second tiling decision among mapping decisions associated with executing the dataflow application by the second computing system.

Example Implementation 16

The example of implementation 13, wherein the compiler is further configured to execute on the processor to determine, based on a second shared dimension of output and input tensors of a second set of operators among the operators included in the graph, a second pipeline comprising the second set of operators; determine a second tiling decision associated with the second pipeline; determine a second tiling cost corresponding to the second tiling decision, the second tiling cost based on a second optimization objective; determine, based on the second tiling cost, that the second tiling decision does not improve a second optimization; and, exclude, based on the determining that the second tiling decision does not improve the second optimization objective, the second pipeline from among the mapping decisions associated with executing the dataflow application by the second computing system Example Implementation 17

The example of implementation 13, wherein the first tiling decision comprises a first tile shape to slice an output tensor of a first operator, included in the first pipeline, the output tensor comprising an input tensor to a second operator included in the first pipeline.

Example Implementation 18

The example of implementation 13, wherein the compiler configured to execute on the processor to determine the first tiling cost comprises the compiler further configured to execute on the processor to determine the first tiling cost by comparing the first tiling cost to a threshold value of an optimization metric associated with the first optimization objective.

Example Implementation 19

The example of implementation 13, wherein the first optimization objective comprises a memory optimization objective selected from a group consisting of: a first tile shape fitting in a first memory of the second computing system; increasing a utilization of a second memory of the second computing system; reducing a number of stage buffers among a first producer operator and a first consumer operator included in the first pipeline; and, reducing a size of a stage buffer among a second producer operator and a second consumer operator.

Example Implementation 20

The example of implementation 13, wherein the first optimization objective comprises a processing optimization objective selected from a group consisting of: increasing a number of operators comprising the first pipeline; increasing a number of parallel operations performed by the second computing system to execute the dataflow application; increasing a utilization of a first processor of the second computing system to execute the dataflow application; and, balancing pipeline stages in the first pipeline.

What is claimed is:

1. A method, the method comprising:

determining, by a compiler of a first computing system, based on a first shared dimension of output and input tensors of a first set of operators, a first pipeline comprising the first set of operators, the first set of operators among operators included in a graph, the operators included in the graph comprising operators of a dataflow application, wherein a given pair of consecutive operators in the first set of operators is configured such that an output tensor of the first operator in the given pair of consecutive operators has a first dimension equal to the first shared dimension, an input tensor to the second operator in the given pair of consecutive operators has a second dimension also equal to the first shared dimension, and wherein by sharing the first shared dimension, the first set of operators performs computations in parallel;

determining, by the compiler, a first tiling decision associated with the first pipeline, wherein the first tiling decision is based at least on the first shared dimension, and wherein the first tiling decision specifies a tile size and an overlap amount for slicing tensors shared between consecutive operators in the first pipeline;

determining, by the compiler, a first tiling cost associated with the first tiling decision, the first tiling cost corresponding to a first optimization objective, wherein determining the first tiling cost comprises computing, by the compiler using a tiling cost model, a metric indicative of at least one of memory utilization efficiency, processor utilization, and computational parallelism achievable when executing the first pipeline on the second computing system using the tile size and overlap amount;

determining, by the compiler, based on the first tiling cost, that the first tiling decision improves the first optimization objective; and including, by the compiler, based on the determining that the first tiling decision improves the first optimization objective, the first pipeline and the first tiling decision among mapping decisions associated with executing the dataflow application by a second computing system, wherein the first tiling decision increases parallelization of computations and processor utilization on the second computing system by enabling the second computing system to process multiple tiles of the tensors concurrently across processing elements of the second computing system.

2. The method of claim 1, wherein the first pipeline comprises a nested pipeline.

3. The method of claim 1, wherein the method further comprises:

determining, by the compiler, a second tiling decision associated with an operator among the operators included in the graph;

determining, by the compiler, a second tiling cost associated with the operator, the second tiling cost corresponding to a second optimization objective;

determining, by the compiler, based on the second tiling cost, that the second tiling decision improves the second optimization objective; and including, by the compiler, based on the determining that the second tiling decision improves the second optimization objective, the operator and the second tiling decision among mapping decisions associated with executing the dataflow application by the second computing system.

4. The method of claim 1, the method further comprising:

determining, by the compiler, based on a second shared dimension of output and input tensors of a second set of operators among the operators included in the graph, a second pipeline comprising the second set of operators;

determining, by the compiler, a second tiling decision associated with the second pipeline;

determining, by the compiler, a second tiling cost corresponding to the second tiling decision, the second tiling cost based on a second optimization objective;

determining, by the compiler, based on the second tiling cost, that the second tiling decision does not improve a second optimization; and excluding, by the compiler, based on the determining that the second tiling decision does not improve the second optimization objective, the second pipeline from among the mapping decisions associated with executing the dataflow application by the second computing system.

5. The method of claim 1, wherein the first tiling decision comprises a first tile shape to slice an output tensor of a first operator, included in the first pipeline, the output tensor comprising an input tensor to a second operator included in the first pipeline.

6. The method of claim 1, wherein the method of the compiler determining the first tiling cost comprises determining, by the compiler, the first tiling cost using a tiling cost model to compute the first tiling cost.

7. The method of claim 1, wherein the method of determining, by the compiler, based on the first tiling cost, that the first tiling decision improves the first optimization objective comprises comparing, by the compiler, the first tiling cost to a threshold value of an optimization metric associated with the first optimization objective.

8. The method of claim 1, wherein the first optimization objective comprises a memory optimization objective selected from a group consisting of: a first tile shape fitting in a first memory of the second computing system; increasing a utilization of a second memory of the second computing system; reducing a number of stage buffers among a first producer operator and a first consumer operator included in the first pipeline; and, reducing a size of a stage buffer among a second producer operator and a second consumer operator.

9. The method of claim 1, wherein the first optimization objective comprises a processing optimization objective selected from a group consisting of: increasing a number of operators comprising the first pipeline; increasing a number of parallel operations performed by the second computing system to execute the dataflow application; increasing a utilization of a first processor of the second computing system to execute the dataflow application; and, balancing pipeline stages in the first pipeline.

10. A computer program product, the computer program product comprising a computer readable storage medium having first program instructions embodied therewith, wherein the first program instructions are executable by at least one processor to cause the at least one processor to:

determine, based on a first shared dimension of output and input tensors of a first set of operators, a first pipeline comprising the first set of operators, the first set of operators among operators included in a graph, the operators included in the graph comprising operators of a dataflow application, wherein a given pair of consecutive operators in the first set of operators is configured such that an output tensor of the first operator in the given pair of consecutive operators has a first dimension equal to the first shared dimension, and an input tensor to the second operator in the given pair of consecutive operators has a second dimension also equal to the first shared dimension, and wherein by sharing the first shared dimension, the first set of operators performs computations in parallel;

determine a first tiling decision associated with the first pipeline, wherein the first tiling decision is based at least on the first shared dimension, and wherein the first tiling decision specifies a tile size and an overlap amount for slicing tensors shared between consecutive operators in the first pipeline;

determine, a first tiling cost associated with the first tiling decision, the first tiling cost corresponding to a first optimization objective, wherein determining the first tiling cost comprises computing, using a tiling cost model, a metric indicative of at least one of memory utilization efficiency, processor utilization, and computational parallelism achievable when executing the first pipeline on the second computing system using the tile size and overlap amount;

determine, based on the first tiling cost, that the first tiling decision improves the first optimization objective; and include, based on the determining that the first tiling decision improves the first optimization objective, the first pipeline and the first tiling decision among mapping decisions associated with executing the dataflow application by a second computing system, wherein the first tiling decision increases parallelization of computations and processor utilization on the second computing system by enabling the second computing system to process multiple tiles of the tensors concurrently across processing elements of the second computing system.

11. The computer program product of claim 10, wherein the first program instructions are executable by the at least one processor to further cause the at least one processor to:

determine the first tiling cost using a tiling cost model to compute the first tiling cost.

12. The computer program product of claim 10, wherein the first program instructions are executable by the at least one processor to further cause the at least one processor to:

determine a second tiling decision associated with an operator among the operators included in the graph;

determine a second tiling cost associated with the operator, the second tiling cost corresponding to a second optimization objective;

determine, based on the second tiling cost, that the second tiling decision does not improve a second optimization objective; and exclude, based on the determining that the second tiling decision improves the second optimization objective, the operator and the second tiling decision among mapping decisions associated with executing the dataflow application by the second computing system.

13. A first computing system, the first computing system comprising:

a processor and a compiler, the compiler configured to execute on the processor to:

determine, based on a first shared dimension of output and input tensors of a first set of operators, a first pipeline comprising the first set of operators, the first set of operators among operators included in a graph, the operators included in the graph comprising operators of a dataflow application, wherein a given pair of consecutive operators in the first set of operators is configured such that an output tensor of the first operator in the given pair of consecutive operators has a first dimension equal to the first shared dimension, and an input tensor to the second operator in the given pair of consecutive operators has a second dimension also equal to the first shared dimension, and wherein by sharing the first shared dimension, the first set of operators performs computations in parallel;

determine a first tiling decision associated with the first pipeline, wherein the first tiling decision is based at least on the first shared dimension, and wherein the first tiling decision specifies a tile size and an overlap amount for slicing tensors shared between consecutive operators in the first pipeline;

determine a first tiling cost associated with the first tiling decision, the first tiling cost corresponding to a first optimization objective, wherein determining the first tiling cost comprises computing, using a tiling cost model, a metric indicative of at least one of memory utilization efficiency, processor utilization, and computational parallelism achievable when executing the first pipeline on the second computing system using the tile size and overlap amount;

determine, based on the first tiling cost, that the first tiling decision improves the first optimization objective; and include, based on the determining that the first tiling decision improves the first optimization objective, the first pipeline and the first tiling decision among mapping decisions associated with executing the dataflow application by a second computing system, wherein the first tiling decision increases parallelization of computations and processor utilization on the second computing system by enabling the second computing system to process multiple tiles of the tensors concurrently across processing elements of the second computing system.

14. The first computing system of claim 13, wherein the first pipeline comprises a nested pipeline.

15. The first computing system of claim 13, wherein the compiler is further configured to execute on the processor to:

determine a second tiling decision associated with an operator among the operators included in the graph;

determine a second tiling cost associated with the operator, the second tiling cost corresponding to a second optimization objective;

determine, based on the second tiling cost, that the second tiling decision improves the second optimization objective; and include, based on the determining that the second tiling decision improves the second optimization objective, the operator and the second tiling decision among mapping decisions associated with executing the dataflow application by the second computing system.

16. The first computing system of claim 13, wherein the compiler is further configured to execute on the processor to:

determine, based on a second shared dimension of output and input tensors of a second set of operators among the operators included in the graph, a second pipeline comprising the second set of operators;

determine a second tiling decision associated with the second pipeline;

determine a second tiling cost corresponding to the second tiling decision, the second tiling cost based on a second optimization objective;

determine, based on the second tiling cost, that the second tiling decision does not improve a second optimization; and exclude, based on the determining that the second tiling decision does not improve the second optimization objective, the second pipeline from among the mapping decisions associated with executing the dataflow application by the second computing system.

17. The first computing system of claim 13, wherein the first tiling decision comprises a first tile shape to slice an output tensor of a first operator, included in the first pipeline, the output tensor comprising an input tensor to a second operator included in the first pipeline.

18. The first computing system of claim 13, wherein the compiler configured to execute on the processor to determine the first tiling cost comprises the compiler further configured to execute on the processor to determine the first tiling cost by comparing the first tiling cost to a threshold value of an optimization metric associated with the first optimization objective.

19. The first computing system of claim 13, wherein the first optimization objective comprises a memory optimization objective selected from a group consisting of: a first tile shape fitting in a first memory of the second computing system; increasing a utilization of a second memory of the second computing system; reducing a number of stage buffers among a first producer operator and a first consumer operator included in the first pipeline; and, reducing a size of a stage buffer among a second producer operator and a second consumer operator.

20. The first computing system of claim 13, wherein the first optimization objective comprises a processing optimization objective selected from a group consisting of: increasing a number of operators comprising the first pipeline; increasing a number of parallel operations performed by the second computing system to execute the dataflow application; increasing a utilization of a first processor of the second computing system to execute the dataflow application; and, balancing pipeline stages in the first pipeline.

* * * * *